July 13, 1948. W. W. PAGET 2,444,951
CABIN CONDITIONS CONTROLLING APPARATUS
Filed April 9, 1943 18 Sheets-Sheet 3
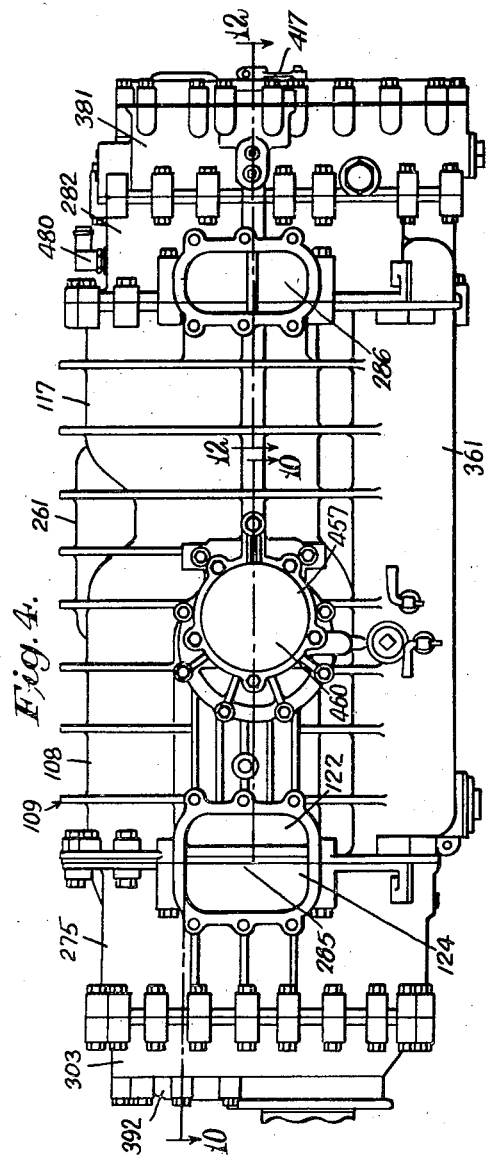
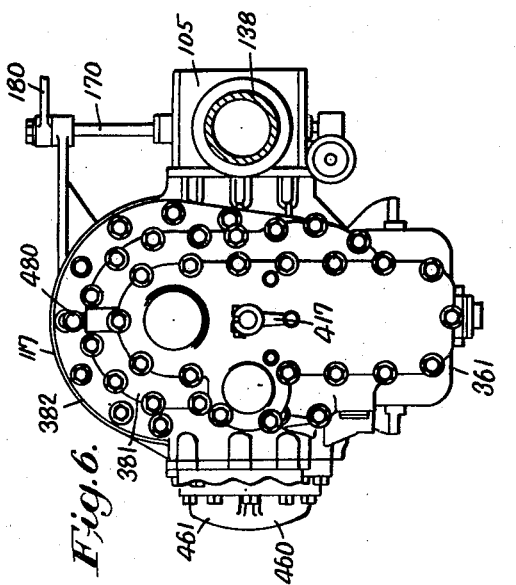
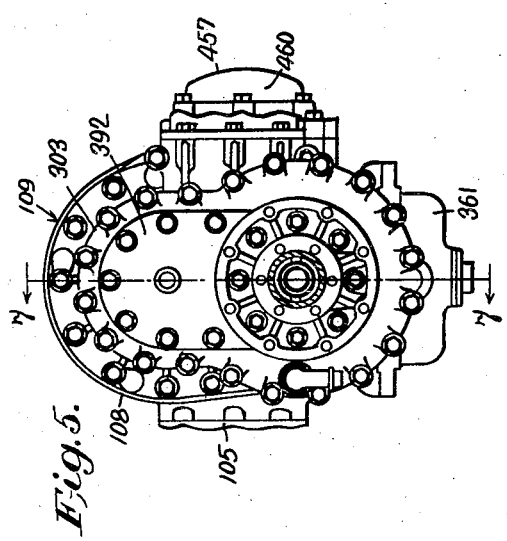
Inventor:
Win W. Paget.
by
Louis A. Maxson.
Atty.

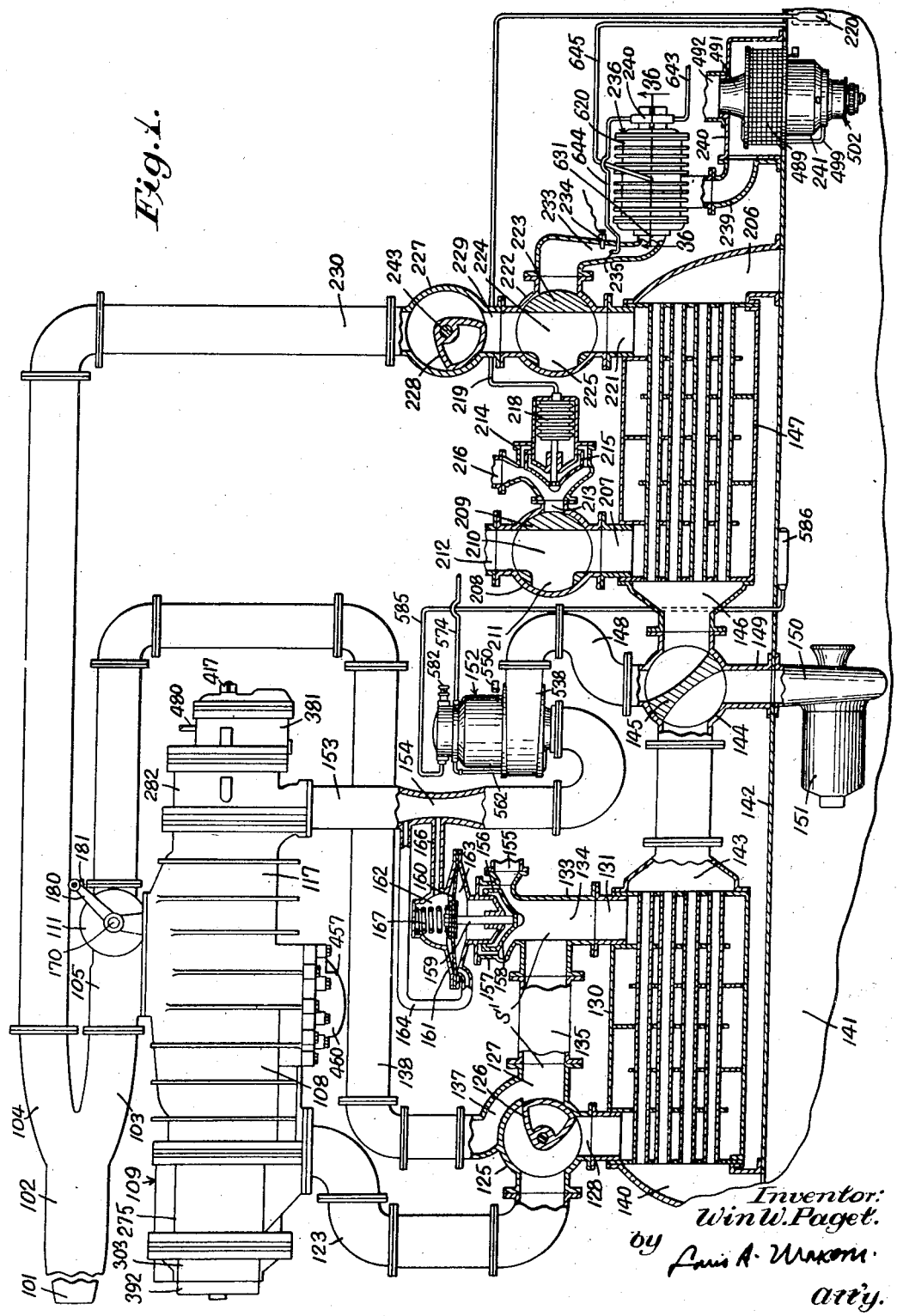

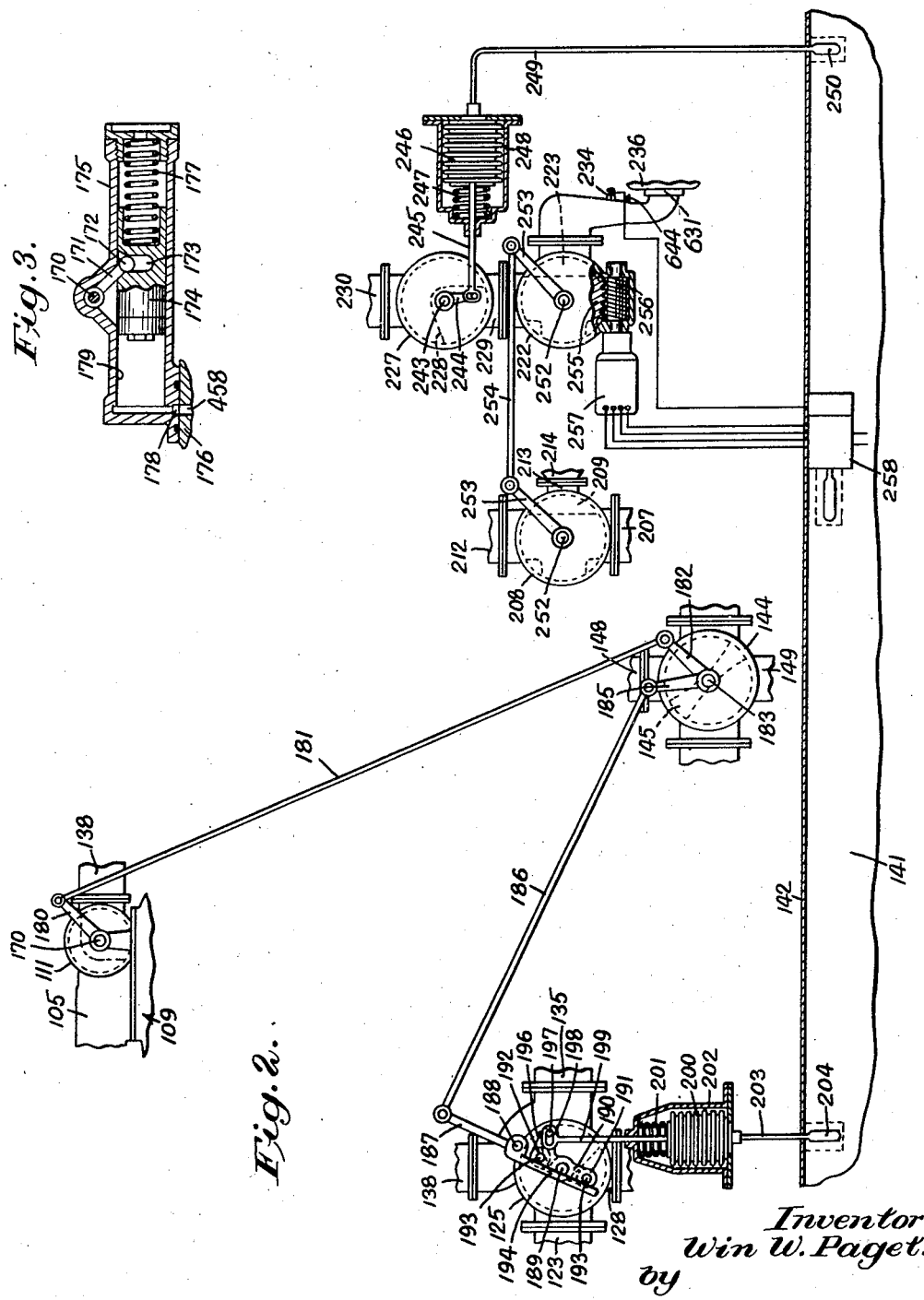

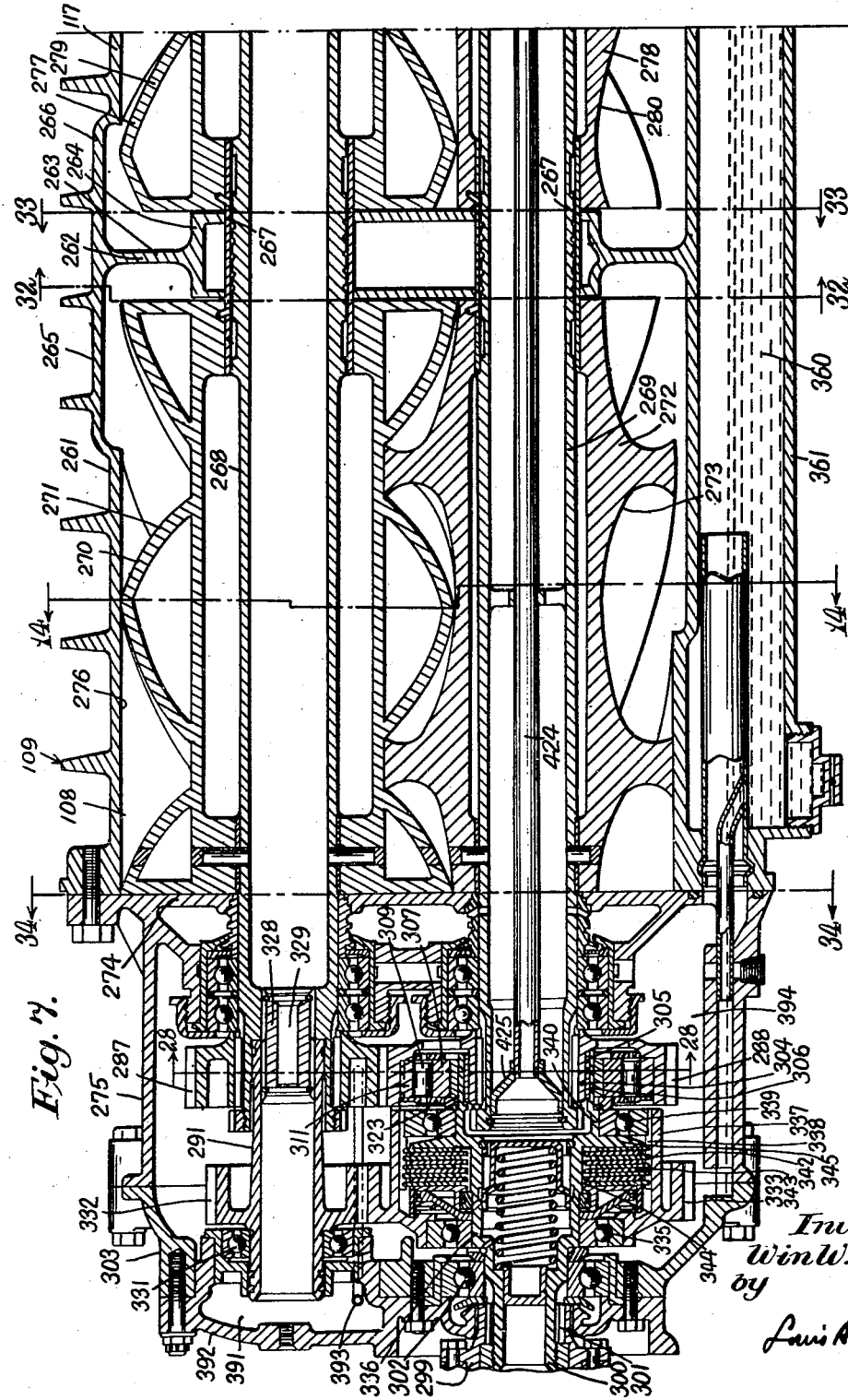

July 13, 1948.  W. W. PAGET  2,444,951
CABIN CONDITIONS CONTROLLING APPARATUS
Filed April 9, 1943  18 Sheets-Sheet 5

Inventor:
Win W. Paget.
by
Lewis A. Maxam.
atty.

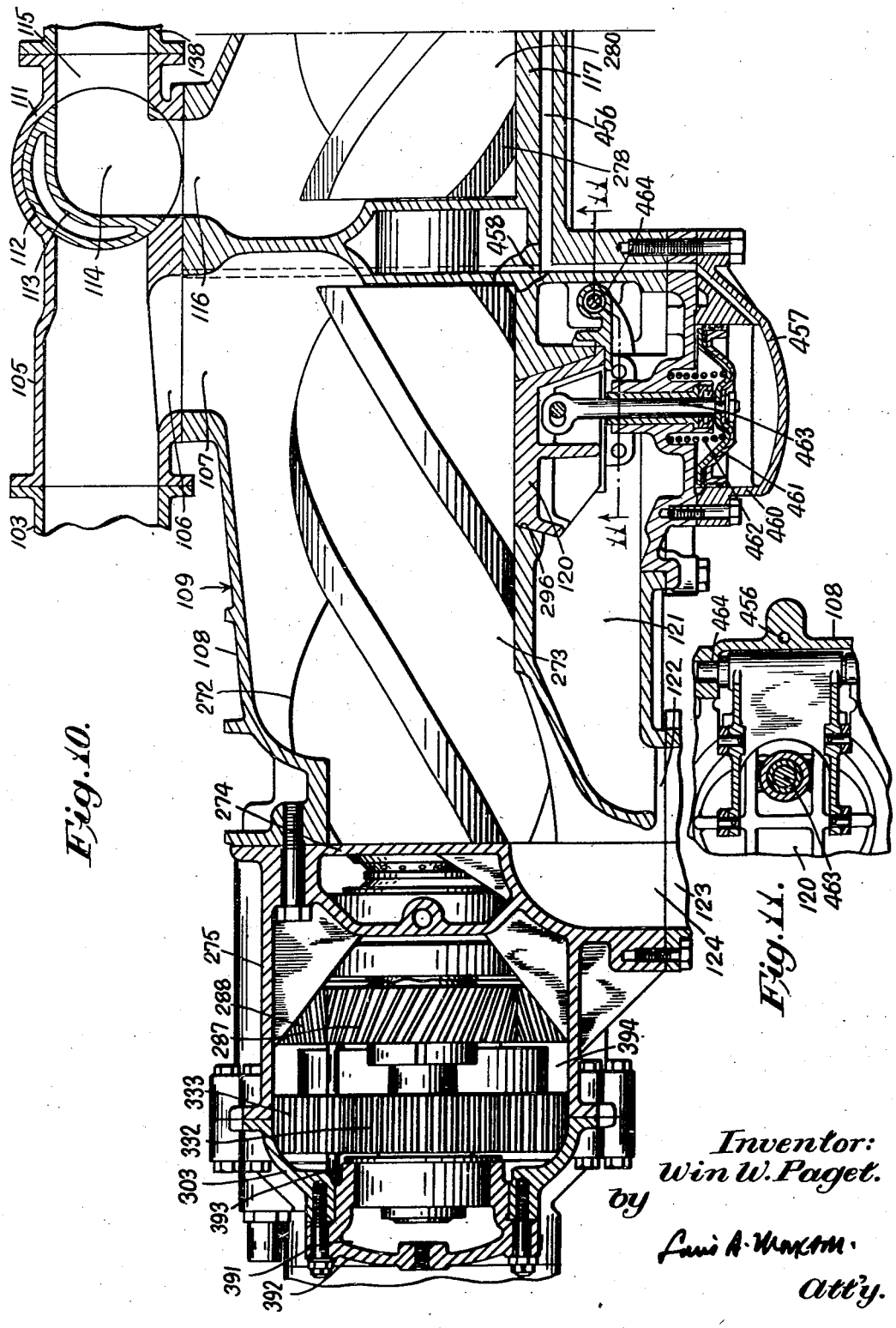

July 13, 1948.  W. W. PAGET  2,444,951
CABIN CONDITIONS CONTROLLING APPARATUS
Filed April 9, 1943  18 Sheets-Sheet 7

Inventor:
Win W. Paget.
by
Louis A. Waxom
Atty.

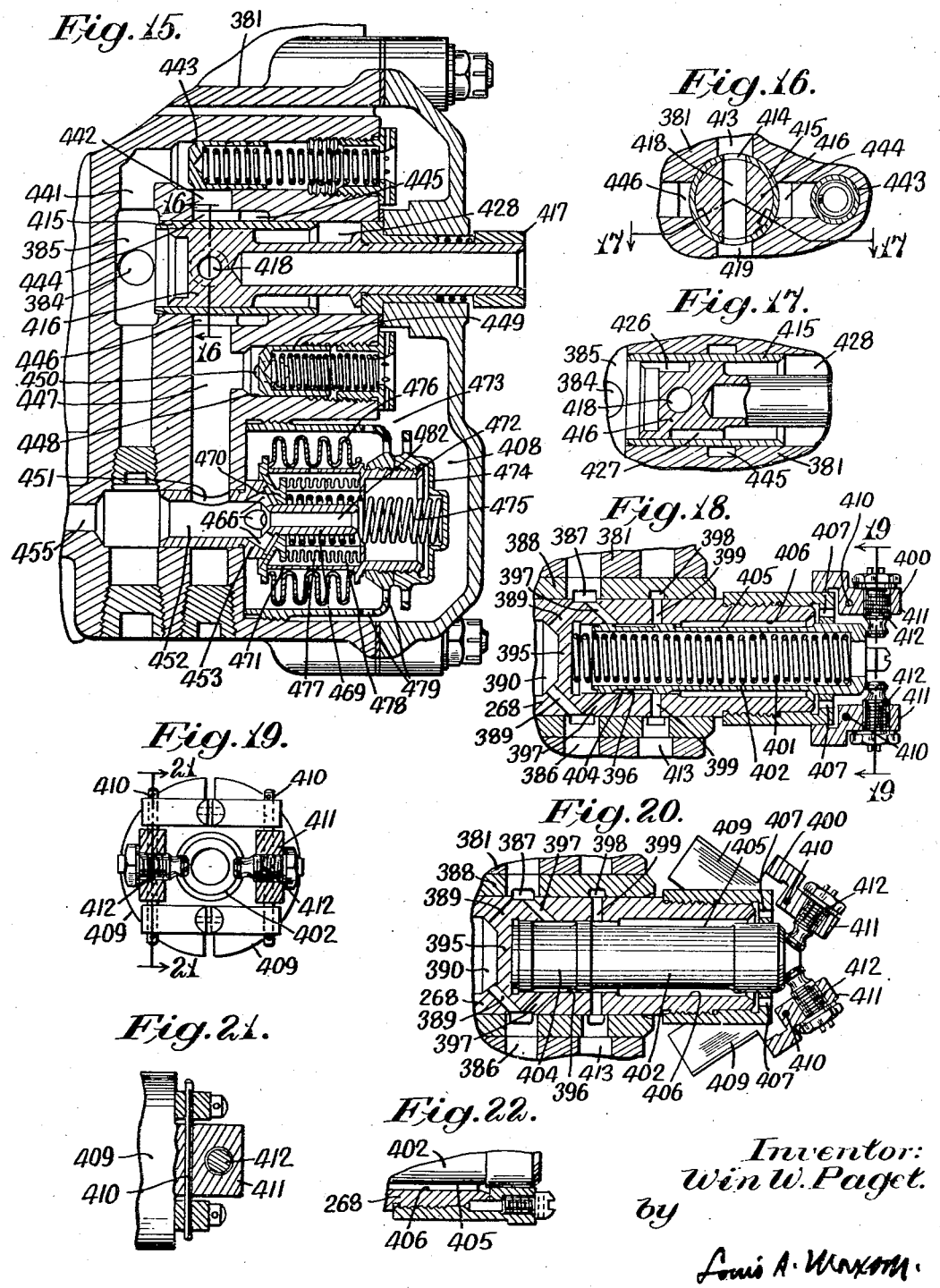

July 13, 1948.　　　　W. W. PAGET　　　　2,444,951
CABIN CONDITIONS CONTROLLING APPARATUS
Filed April 9, 1943　　　　　　　　　　　　　　18 Sheets-Sheet 9
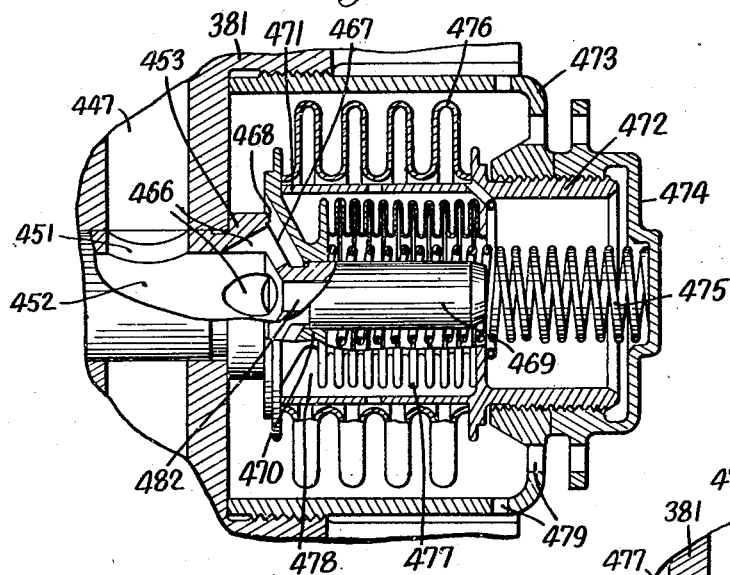
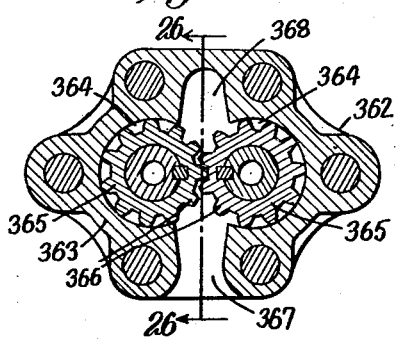
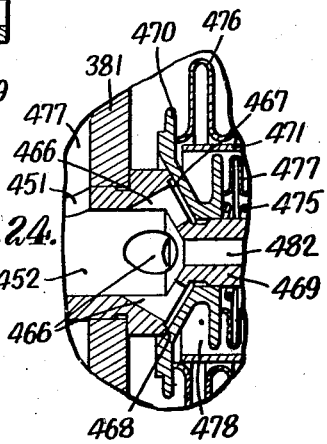
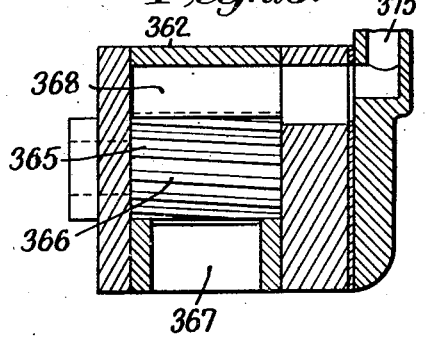
Inventor:
Win W. Paget.
by
Louis A. Maxom.
atty.

July 13, 1948.  W. W. PAGET  2,444,951
CABIN CONDITIONS CONTROLLING APPARATUS
Filed April 9, 1943  18 Sheets-Sheet 10
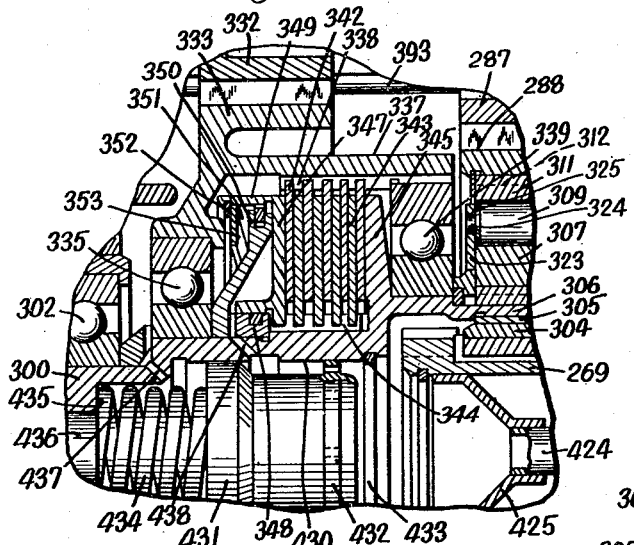
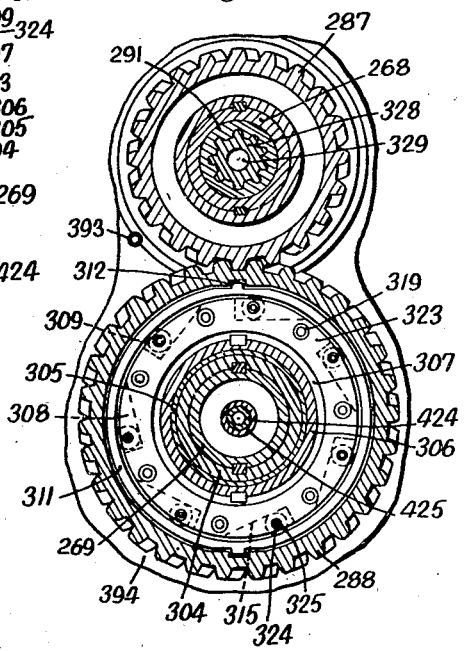
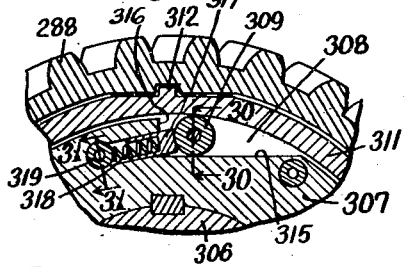
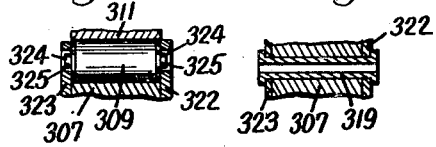
Inventor:
Win W. Paget
by
Louis A. Maxom
att'y

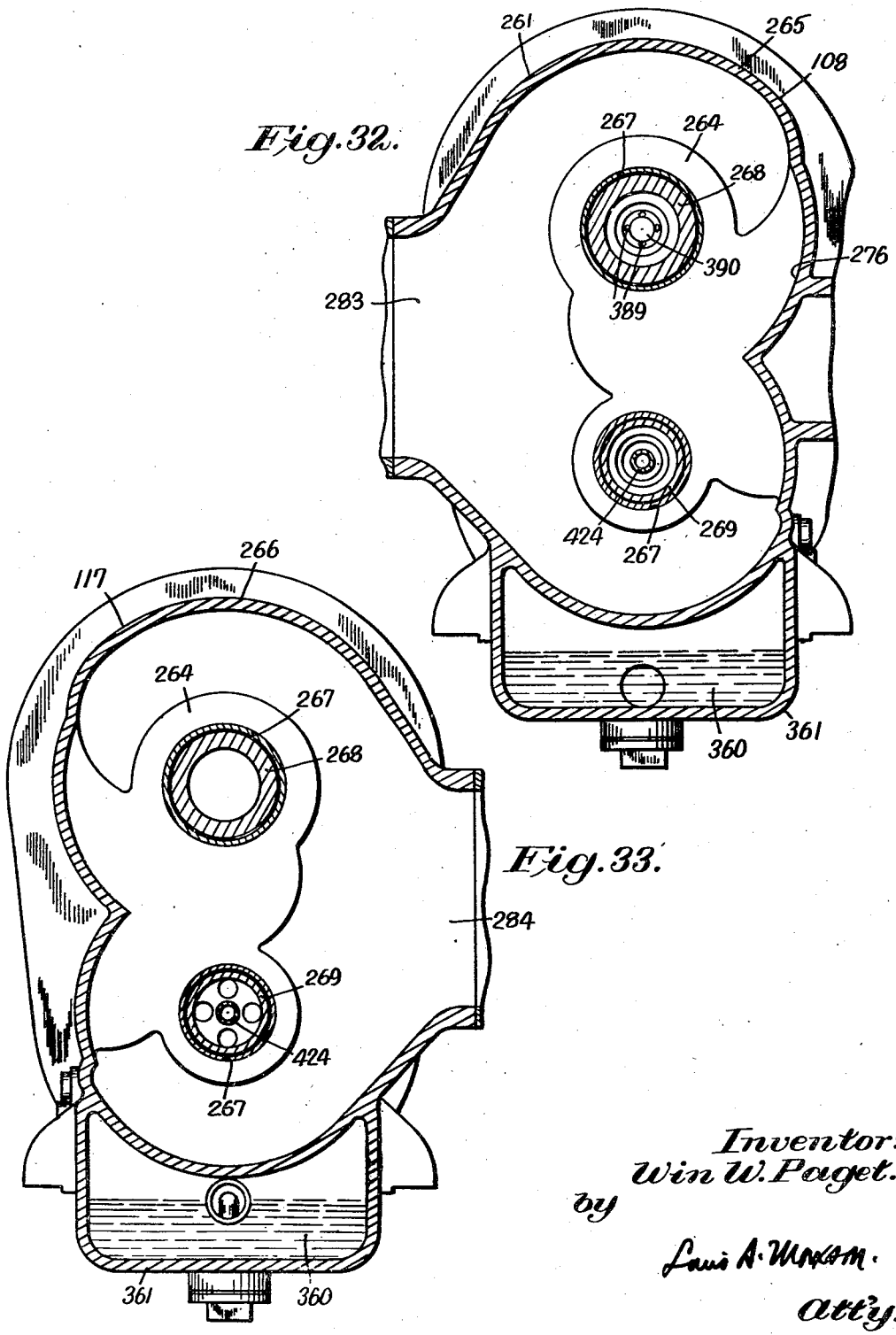

July 13, 1948.  W. W. PAGET  2,444,951
CABIN CONDITIONS CONTROLLING APPARATUS
Filed April 9, 1943  18 Sheets-Sheet 12

Inventor:
Win W. Paget.
by
atty.

July 13, 1948. W. W. PAGET 2,444,951
CABIN CONDITIONS CONTROLLING APPARATUS
Filed April 9, 1943 18 Sheets-Sheet 13

Inventor:
Win W. Paget.
by
Louis A. Maxson.
Atty.

July 13, 1948.  W. W. PAGET  2,444,951
CABIN CONDITIONS CONTROLLING APPARATUS
Filed April 9, 1943  18 Sheets-Sheet 14
Fig. 40.
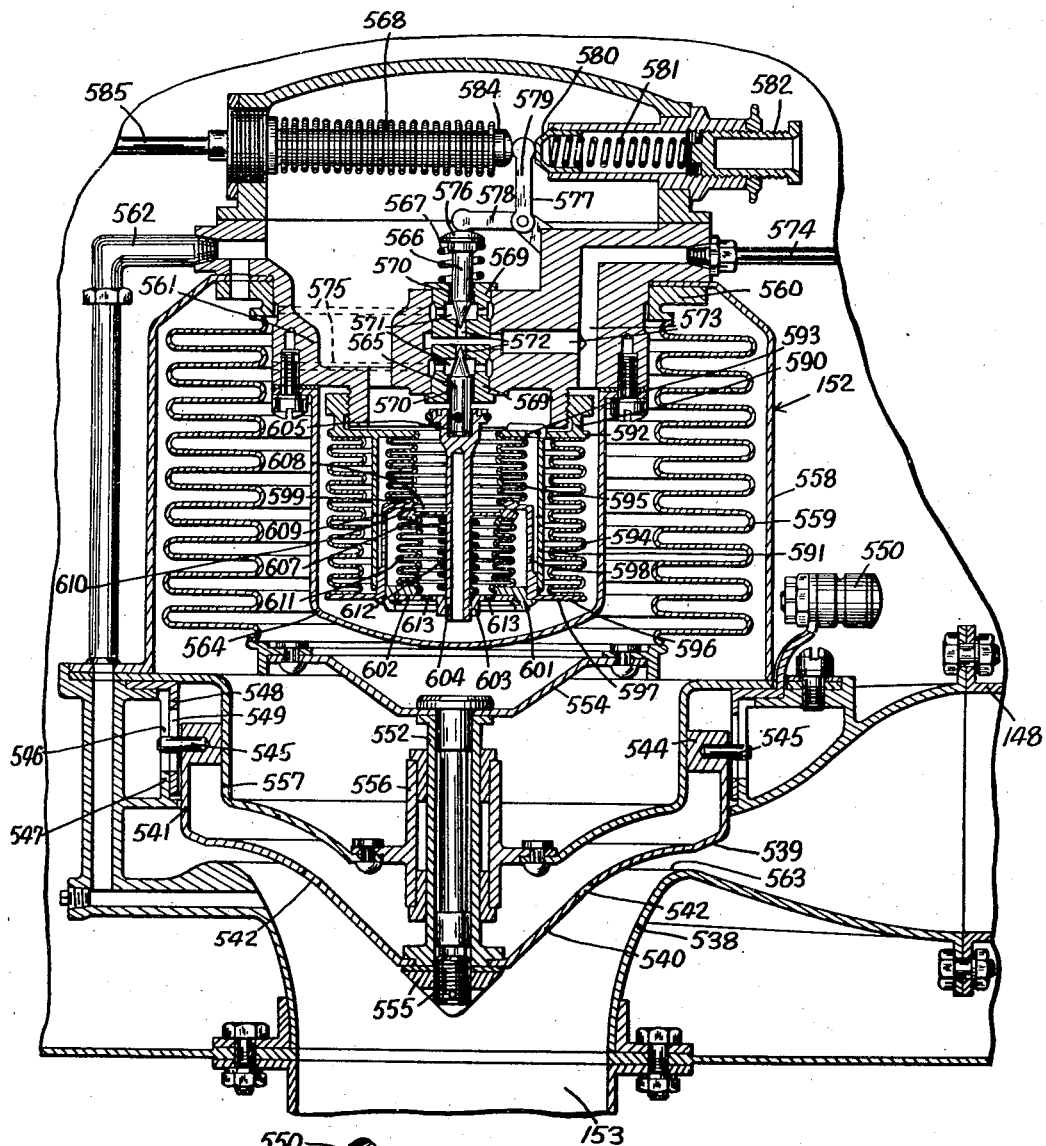
Fig. 40ª
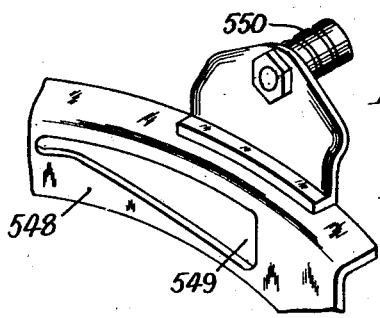
Inventor:
Win W. Paget.
by
Louis A. Maxson.
Atty.

July 13, 1948. W. W. PAGET 2,444,951
CABIN CONDITIONS CONTROLLING APPARATUS
Filed April 9, 1943 18 Sheets-Sheet 15
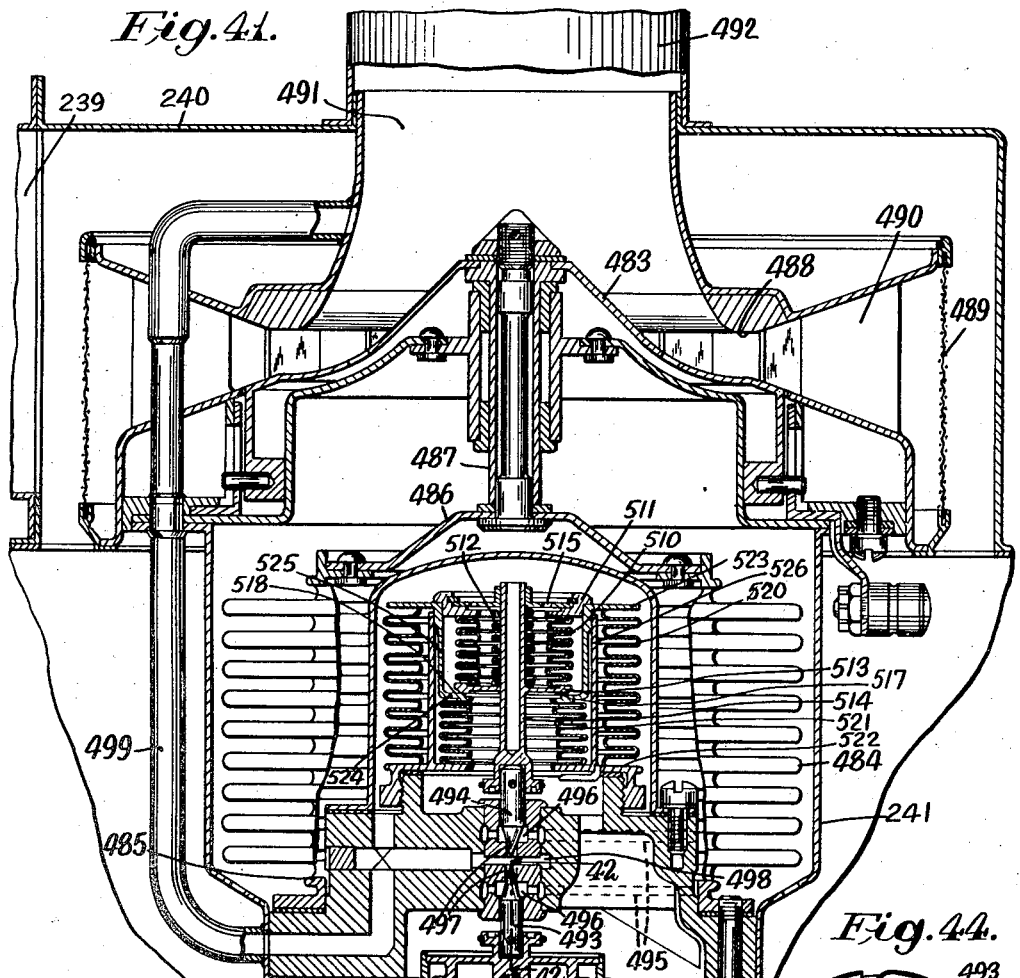
Fig. 41.
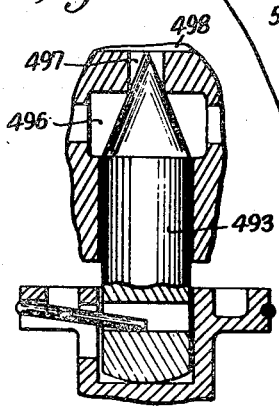
Fig. 42.
Fig. 43.
Fig. 44.
Inventor:
Wm. W. Paget.
by
Louis A. Maxam
Atty.

July 13, 1948. W. W. PAGET 2,444,951
CABIN CONDITIONS CONTROLLING APPARATUS
Filed April 9, 1943 18 Sheets-Sheet 18

Inventor:
Win W. Paget.
by
Anns A. Maxson.
Atty.

Patented July 13, 1948

2,444,951

UNITED STATES PATENT OFFICE 2,444,951

CABIN CONDITIONS CONTROLLING APPARATUS

Win W. Paget, Michigan City, Ind., assignor to Joy Manufacturing Company, a corporation of Pennsylvania Application April 9, 1943, Serial No. 482,422

65 Claims. (Cl. 257—3)

My invention relates to cabin pressurizing systems, and more particulaly to systems for controlling the pressure and the temperature within aircraft cabins.

In the operation of aircraft at high altitudes it is necessary to provide for higher compression ratios than is practicable with single-stage centrifugal type superchargers, and because of installation complications, and to a lesser degree due to weight restrictions, the provision of inter-cooling equipment between the stages of multi-stage superchargers has so far been precluded. The difficulty previously found in providing all kinds of cooling equipment having communication with the exterior surfaces on planes is also a factor which has hampered the provision of thoroughly efficient supercharging equipment.

The control of the temperature of the air in supercharged cabins is also a problem which has needed, but not received, adequate attention. At heights above 25,000 feet all of the heat of compression produced is generally required to maintain comfortable cabin temperatures. Below that height, the problem is affected by numerous factors, and in cold weather the heat of compression may be needed at low altitudes or on the ground, while in warm weather cooling may be needed even at substantial heights.

It is an object of my invention to provide an improved cabin pressurizing system. It is another object of my invention to provide an improved cabin temperature controlling system. It is a further object of my invention to provide an improved cabin pressure and temperature controlling system. It is still another object of my invention to provide an improved multi-stage cabin pressurizing device. Another object of my invention is to provide an improved cabin pressurizing and temperature controlling system in which air from the intake to the supercharger may be conducted and utilized to cool the discharge of the second stage of such supercharger in an appropriate aftercooler. Another object of my invention is to provide an improved cabin pressure control system including an aftercooler which may also be used as a heater. Another object of my invention is to provide an improved cabin heating device of an improved construction whereby the quantities of air and heating fuel may be automatically maintained in the desired ratios. Still another object of my invention is to provide an improved cabin heating system whereby the heater burner is so located that both contamination of the cabin air and the introduction of an explosive mixture into the cabin are precluded. Yet a further object of my invention is to provide an improved cabin heating arrangement whereby cabin air may be utilized to provide a sealing zone to prevent the possibility of contamination of cabin air by the products of combustion. Still another object of the invention is to provide an improved cabin temperature controlling system in which temperature may be increased either by heating by means of heating devices operated by the combustion of fuel or by heating by the imposition of back pressure upon the cabin pressurizing device. Yet a further object of the invention is to provide an improved cabin temperature and pressure regulating system utilizing plural stage supercharging devices in which regulation of the intake pressure of the second stage is effected by means of a bypass valve variably distributing air from the first stage discharge between the second stage intake and a return line to the atmosphere, said valve being governed automatically by the rate of flow from the second stage discharge. Still a further object is to provide an improved cabin temperature controlling system embodying a multi-stage supercharger and utilizing air bypassed to atmosphere from the first stage discharge to cool the second stage discharge to the cabin. A further object of the invention is to provide an improved cabin temperature controlling system utilizing cabin air, flowing in a closed circuit, to intercool air between the stages of a compound supercharger, thus both performing an intercooling function and also helping to heat the cabin. Yet another object of the invention is to provide an improved cabin pressure and temperature controlling system through the use of a heat exchanger between the second stage discharge of a compound supercharger and the cabin, and selectively passing through the other course of such heat exchanger either cooling air from outside the cabin or heated air secured by burning liquid fuel in cabin discharge air. Again, an object of the invention is to provide an improved heating device using cabin discharge air to support combustion (at cabin pressure) in the heater unit, the amount of fuel injected into the air being controlled by means of a positive displacement device which delivers so much fuel for so much air. Another object of the invention from the aspect last mentioned is to provide for an improved heating device of the character mentioned an improved arrangement whereby the air from the cabin to the flow control-and-metering unit may take the air before fuel has been injected and have the air which traverses it actually support combustion. A further object of the invention is to provide an improve arrangement of a flow control-and-metering unit in which combustion products which have been cooled by passage through a heat exchanger may operate the unit to deliver fuel to a stream of cabin air on its way to the heat exchanger. From another aspect, it is an object of my invention to provide an improved cabin pressurizing and temperature controlling system in which cooling air for any heat exchangers used and air for a rammed inlet connection to a supercharger are derived from a single, common rammed inlet, thus avoiding the necessity for a separate inlet and ducting system for the heat exchanger. Still another object of the invention from another aspect thereof is to provide an improved multi-stage supercharger. Other objects and advantages of the invention will hereinafter appear.

To meet the foregoing objects, I provide, in a preferred embodiment of my invention, from its system aspect, an improved multi-stage air pumping apparatus which is capable of single-stage or multi-stage compression and in which the air is adapted to be passed between the stages of compression, through a cabin heating system, with all the heat extracted being delivered to the cabin air. I further desirably provide, in such preferred embodiment, an improved arrangement whereby any desired amount of air delivered by the primary stage may be bypassed to the outside of the cabin instead of being delivered to the intake of the second stage. As will be understood, were a larger number of stages provided, the same procedure could be adopted between stages whenever needed. Under certain conditions later described, the control of bypassing may be such as to provide for the delivery of just enough air to the second stage to enable the same to deliver the needed air to the cabin. Another feature which may desirably be included in a preferred embodiment of my invention from its system aspect, is the provision of an improved arrangement whereby air from the intake to the supercharger may be conducted and utilized to cool the discharge of the second stage of the supercharger in an appropriate aftercooler. As the maximum quantity of air needed for cooling is only substantially the same as the volume of air handled in the pressurizing system, it will be understood that it will be unnecessary to utilize a harmfully large rammed-air inlet to secure the necessary air volume both for cabin pressurizing and for use as a cooling medium. According to another feature of a preferred embodiment of the invention, the aftercooler may also be used as a heater. According to still another phase of my invention, the pressure differential between the cabin pressure and external pressure may be utilized to operate a heating unit, and the quantities of air and heating fuel may be maintained automatically in the desired ratio. Desirably, also the air line to the heater and to the heater burner may be so located that contamination of the cabin air or the introduction of an explosive mixture into the cabin are precluded. And from another aspect of the invention, the latter may desirably comprise a compound supercharger having improved controlling apparatus whereby the same may be operated as two single stage superchargers. Other features of the invention from its various aspects will appear in the course of the present specification and be defined in the appended claims.

In the accompanying drawings, in which for purposes of illustration one embodiment and a modification of my invention from its system aspect, and various subphases of said invention, are shown for purposes of illustration:

Fig. 1 is a generally diagrammatic view showing a preferred form of the system, parts being shown in elevation and other parts in section.

Fig. 2 is a diagrammatic view of the controlling valve arrangements for the various conduits, parts being shown in elevation.

Fig. 3 is a fragmentary sectional view showing the operating mechanism for a portion of the valve mechanism shown in Fig. 2.

Fig. 4 is a side elevational view of an improved multi-stage supercharger.

Fig. 5 is an end elevational view of the driving end of the supercharger shown in Fig. 4.

Fig. 6 is an end elevational view showing the opposite end of the supercharger shown in Fig. 4.

Fig. 7 is an enlarged partial central longitudinal vertical section on the plane of the line 7—7 of Fig. 5, showing the low pressure stage of the supercharger of Fig. 4, and the drive for said supercharger, and a portion of the high pressure stage.

Fig. 10 is an enlarged horizontal section on the plane of the line 10—10 of Fig. 4, showing details of the unloading mechanism associated with the low pressure stage of the supercharger and of a valve device associated with the high pressure stage of said supercharger, which high pressure stage is shown fragmentarily in Fig. 10.

Fig. 11 is a detail sectional view through the unloading mechanism for the low pressure stage of the supercharger taken on the plane of the line 11—11 of Fig. 10.

Fig. 15 is an enlarged horizontal sectional view through portions of the control mechanism at the right hand end of the supercharger, the view being taken on the same plane as Fig. 12.

Fig. 16 is a fragmentary vertical transverse section on the plane of the line 16—16 of Fig. 15, showing a manually operable control valve positionable to vary the speed of drive of the supercharger.

Fig. 17 is a section on the planes of the lines 17—17 of Fig. 16.

Fig. 18 is an enlarged detail sectional view on the axis of the speed responsive device for controlling the speed of drive of the supercharger.

Fig. 19 is a transverse vertical sectional view on the plane of the line 19—19 of Fig. 18.

Fig. 20 is a fragmentary view, generally similar to Fig. 18 but with parts shown in elevation, and illustrating a different position of the parts.

Fig. 21 is a detail longitudinal sectional view on the plane of the line 21—21 of Fig. 19.

Fig. 22 is a fragmentary detail view showing a locking screw for the governor.

Fig. 23 is an enlarged horizontal sectional view on the same plane as Fig. 12, showing details of construction of the external-pressure-responsive, unloader-valve-controlling pilot mechanism.

Fig. 24 is a fragmentary view on the same plane as Fig. 23, showing the parts in different relative positions.

Fig. 25 is an enlarged transverse vertical section on the plane of the line 25—25 of Fig. 8.

Fig. 26 is a longitudinal view on the line 26—26 of Fig. 25.

Fig. 27 is an enlarged fragmentary sectional view on the plane of Fig. 7, showing details of the speed controlling drive clutch.

Fig. 28 is a vertical sectional view on the plane of the line 28—28 of Fig. 7, showing a portion of the driving gearing.

Fig. 29 is an enlarged transverse fragmentary sectional view showing a detail of the drive mechanism.

Fig. 30 is a fragmentary section on the plane of the line 30—30 of Fig. 29, showing a detail of a roller ratchet.

Fig. 31 is a section on the line 31—31 of Fig. 29, showing another detail of the roller ratchet.

Fig. 32 is a vertical section on the planes of the line 32—32 of Fig. 7, showing the passage arrangement at the intake end of the low pressure stage of the supercharger.

Fig. 33 is a vertical section on the plane of the line 33—33 of Fig. 7, showing the passage arrangement at the intake end of the high pressure stage of the supercharger.

Fig. 40 is an enlarged axial sectional view through a back pressure applying valve shown in Fig. 1.

Fig. 40a is a fragmentary perspective view of a manual control for the back pressure applying valve shown in Fig. 40.

Fig. 41 is an enlarged axial sectional view through a cabin vent valve shown in Fig. 1.

Fig. 42 is an enlarged detail sectional view on the plane of the line 42—42 of Fig. 41.

Fig. 43 is a fragmentary elevational view of the spring arrangement shown in Fig. 42.

Fig. 44 is a fragmentary sectional view on the plane of the line 44—44 of Fig. 43.

Figure 8:
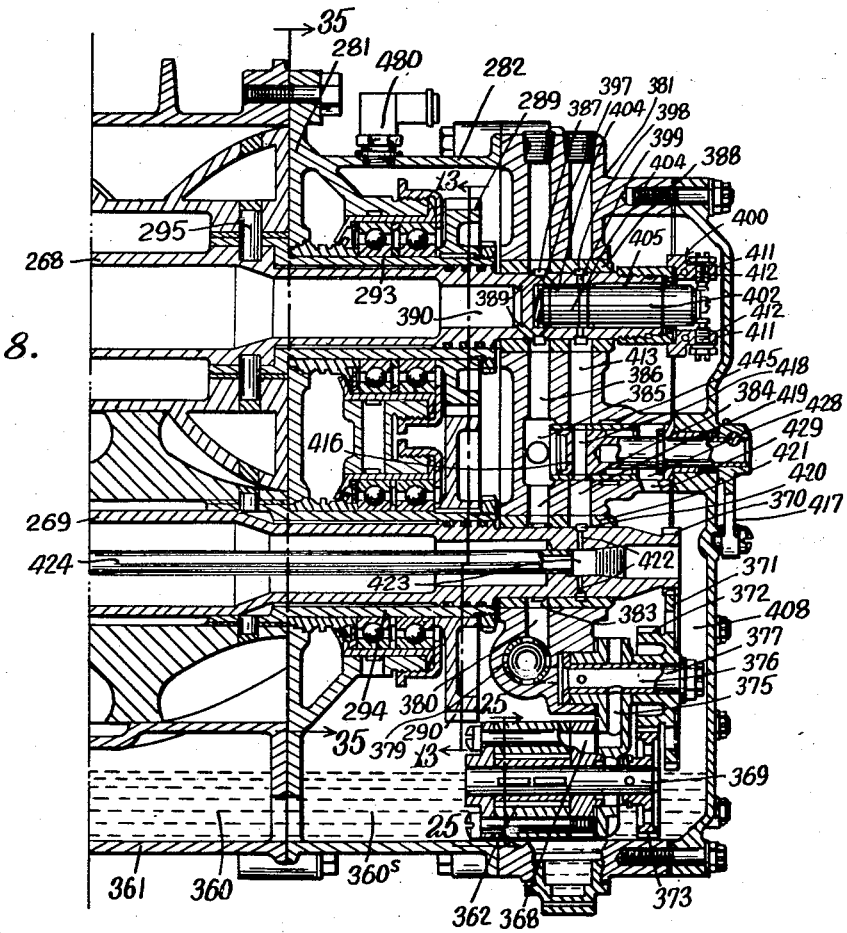
Fig. 8 is a view on the same plane as Fig. 7, showing the remainder of the high pressure end of the supercharger and portions of the control for the drive and for the unloading means of said supercharger, it being understood that Figs. 7 and 8 when taken together constitute an enlarged full length section through the supercharger taken on the plane of the line 7—7 of Fig. 5.
Figure 9:
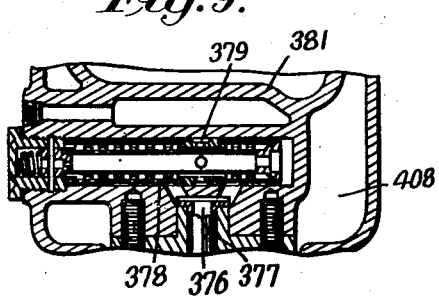
Fig. 9 is a fragmentary detail view showing details of the hydraulic circuit associated with the supercharger, and particularly the strainer portion thereof.
Figure 12:
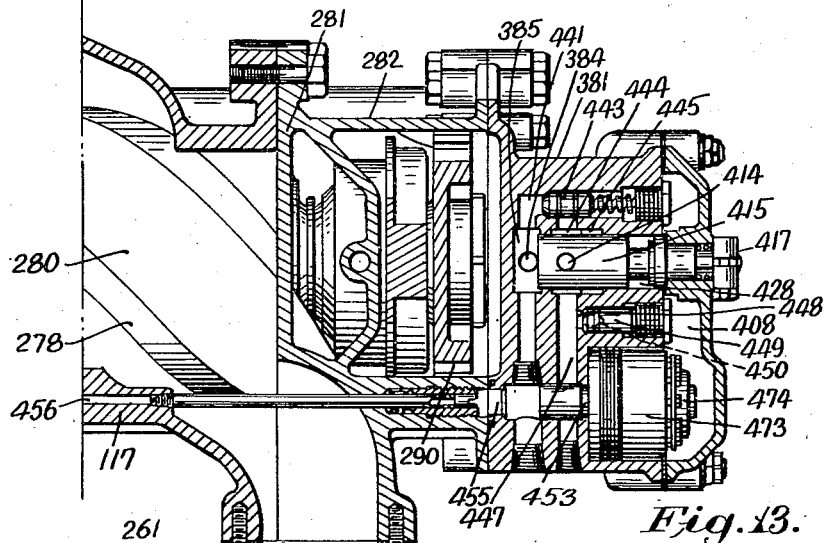
Fig. 12 is an enlarged fragmentary horizontal sectional view on the plane of the line 12—12 of Fig. 4, showing details of construction of the control device spacially associated with the high pressure end of the supercharger, and particularly illustrating controls utilized in governing the operation of the unloading device for the low pressure stage.
Figure 13:
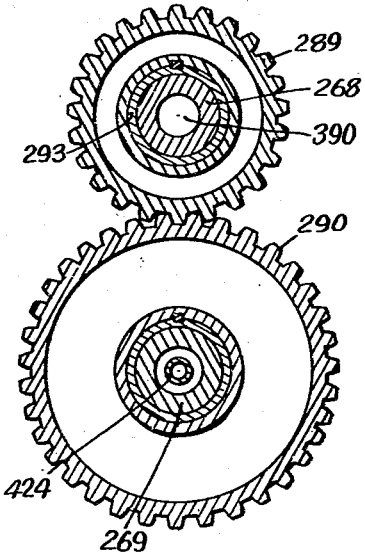
Fig. 13 is a fragmentary sectional view showing the timing gears associated with the high pressure stage of the supercharger, the section being taken on the plane of the line 13—13 of Fig. 8.
Figure 14:
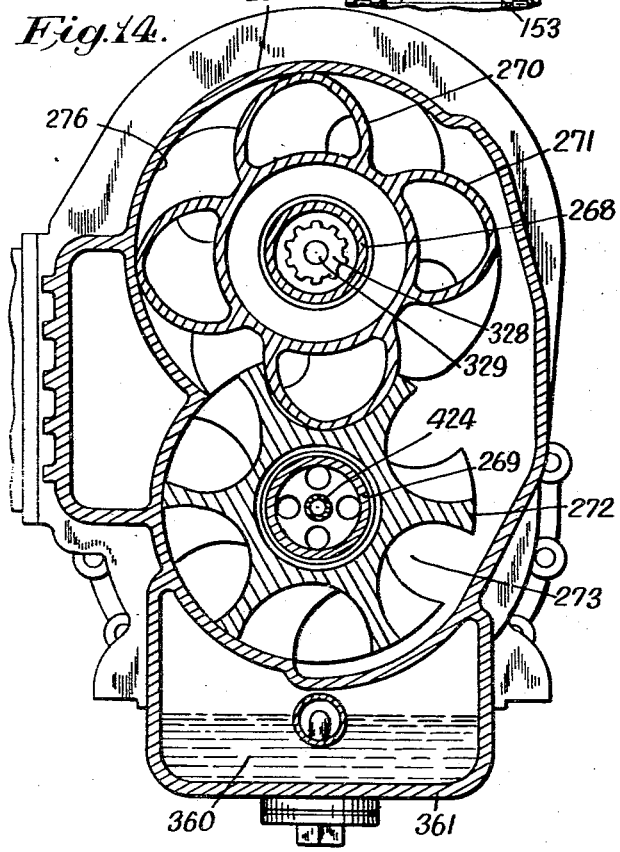
Fig. 14 is a transverse vertical section on the planes of the line 14—14 of Fig. 7.
Figure 34:
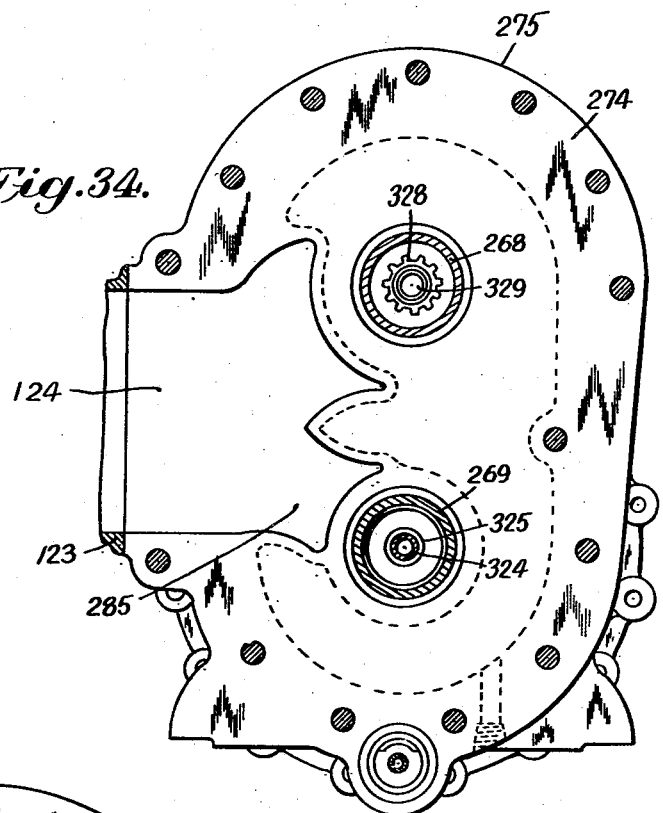
Fig. 34 is a vertical section on the plane of the line 34—34 of Fig. 7, showing the passage arrangement at the discharge end of the low pressure stage of the supercharger.
Figure 35:
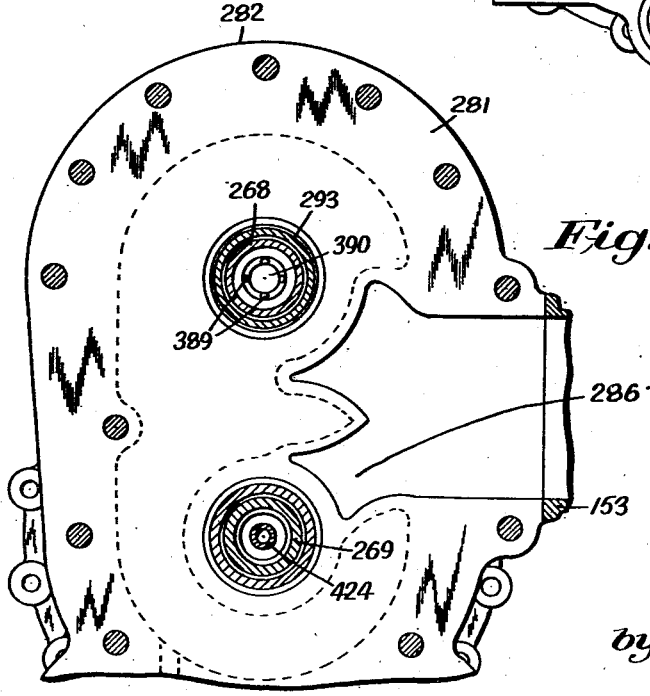
Fig. 35 is a vertical section on the plane of the line 35—35 of Fig. 8, showing the passage arrangement at the discharge end of the high pressure stage of the supercharger.

Referring first to Fig. 1 and to the preferred embodiment of the invention therein illustrated from the system aspect, it will be observed that a rammed inlet 101, arranged for example at a leading edge of an airplane wing (not shown), communicates through a passage 102 with branch conduits 103 and 104. The conduit 103 communicates, as shown herein (see Fig. 10), with a fitting 105 which has an opening 106 communicating with the intake space 107 of the first or primary stage 108 of a multi-stage supercharger, generally designated 109. The fitting 105 also has formed integral therewith a valve-receiving portion 111 within a bore 112 of which a valve 113 is rotatably mounted. This valve 113 has a right-angle passage 114 therein and is adapted, in different positions thereof, to connect the opening 115 at the opposite end of the fitting 105 from the conduit 103 with the intake 116 of the second stage 117 of the multi-stage supercharger 109. In a different position (turned 90° clockwise from the position of Fig. 10) of the valve 113, the passage 114 of said valve connects the space within the fitting 105 at the end of the latter connected to the conduit 103 directly with the intake 116 to the second stage 117 of the supercharger.

The low pressure or primary stage 108 of the supercharger 109 will be described in more detail later, but it may be noted that this stage is provided with an unloading valve 120 which is governed by external pressures (pressures external to the cabin) by means later to be described, and that a connection 121 from the outlet side of the unloading valve 120 communicates at 122 with a conduit 123 which is connected with and leads from the main discharge opening 124 of the low pressure stage 108 and constitutes a discharge line for the latter. The conduit 123 leads to a valve casing 125 in which there is rotatably mounted a valve 126 which distributes the flow of air from the conduit 123 to one or the other, or in part to each, of spaces 127 and 128.

The space 128 is connected with the intake or left-hand end of the outer course of a heat exchanger 130, herein shown as of a conventional shell, tube and baffle type. The other or discharge end of the heat exchanger 130 connects at 131 to a fitting 133 whose interior space 134 is connected by a tubular conduit 135 with the space 127. The space 127, the interior of the conduit 135, and the space 134 may conveniently be considered for certain purposes as space $S^1$. The space S¹, and specifically the space 127, is connected by a passage 137 in the valve casing 125 with a conduit 138 which connects with the opening 115 in the fitting 105. It will therefore be evident that the second stage 117 of the supercharger takes its air during compound operation from the space 127.

The inner course of the heat exchanger 130 is connected at its left-hand end by a passage 140 with the interior space 141 of the airplane cabin 142. The other end of the inner course of heat exchanger 130 is connected, as at 143, to a valve casing 144 in which there is rotatably mounted a valve member 145 which is adapted to connect the connection 143, and a diametrically opposite connection 146 associated with another heat exchanger 147 later to be described, selectively with a conduit 148 or a conduit 149, the last two conduits being diametrically opposite each other with respect to the valve casing 144, and the conduit 148 constituting a portion of the discharge conduit or line for the second stage 117 of the supercharger, and the conduit 149 being connected to the discharge volute 150 of a suitably motor driven air circulator 151 arranged within the cabin space 141. The conduit 148 is connected with the discharge side of a back pressure valve 152 later described, to which fluid is delivered from the second stage discharge of the supercharger 109 by way of a conduit 153 containing a venturi 154.

The space 134 is connectible with an atmospheric vent 155 through an automatically controlled vent-governing valve device 156. This valve device comprises a casing 157 in which a substantially balanced valve 158 is reciprocable. A valve stem 159 connects the valve with a diaphragm 160 which divides a chamber-forming housing 161 into two spaces 162 and 163. The space 163 is at the side of the diaphragm 160 towards the valve 158 and is connected by a conduit 164 with the end of the venturi towards the supercharger high pressure stage discharge, i. e., the entrance or inlet end of the venturi. The chamber 162 is connected by a conduit 166 with the throat of the venturi. A suitable spring 167 acts upon the upper side of the diaphragm to bias the valve 158 towards closed position. When the mass flow of air through the venturi is large, the pressure differential at opposite sides of the diaphragm 160 is such as to open the valve 158 and vent more air to the atmosphere. When the mass flow is less, the pressure differential falls and the valve 158 closes to a greater extent. Thus this valve tends to maintain a relatively uniform mass flow of air through the conduits 138 and 148 during compound operation of the supercharger since it cuts down the air delivered to the intake of the second stage 117 of the supercharger when the latter delivers more air.

The controls of the valves 113, 126 and 145 may now be described. The valve 113 has an operating shaft 170. This operating shaft has, as shown in Fig. 3, an arm 171 fixed thereto, and the arm carries a rounded head 172 received in a slot 173 formed in a piston 174 which is reciprocable in a cylinder 175. This cylinder is suitably mounted upon any suitable support 176 adjacent the valve casing 111, herein upon a portion of the casing of the supercharger 109. A spring 177 normally tends to maintain the piston 174 in a position at the left hand end of its cylinder 175 in Fig. 3, and the arm 171 in a position at right angles to the position shown in Fig. 3. Accordingly, the valve 113 will normally be held in a position at 90° clockwise from the position shown in Fig. 10, unless the piston 174 is moved by fluid to the position shown in Fig. 3.

When the control for the valve 126 is described, there will be explained an automatic, external-pressure-responsive control for hydraulic pressure produced by the operation of a pump driven with the supercharger, and it will suffice for the moment to state that upon the attainment of the aircraft to a preselected level, a portion of the hydraulic pressure then established will be delivered through a port 178 into the bore 179 of the cylinder 175, and this pressure will act upon the piston 174 and move the valve 113 to the position shown in Fig. 10.

The valve shaft 170 has another arm 180 fixed to it. This arm is connected by a link 181 with an arm 182 mounted upon an operating shaft 183 for the valve 145. Accordingly, when the piston 174 is moved to the position shown in Fig. 3, the valve 145, which had previously occupied a position at right angles to the position shown in Figs. 1 and 2, will be moved to the position shown in full lines in Fig. 1 and in dotted lines in Fig. 2. The shaft 183 also has a second arm 185 fixed to it. This arm is connected by a link 186 with an arm 187 which is pivotally supported at 188 on the valve casing 125. The valve 126 has an operating shaft 189 to which there is fixed an arm device 190 comprising oppositely extending portions 191 and 192 each carrying a pin 193 adapted to be engaged by a bar portion 194 fixed to the arm 187 and moved by the latter. The arm portion 192 has a transverse portion 196 carrying a pin 197 received in an elongated eye 198 at the end of an operating rod 199 which is adapted to be moved in one direction by the expansion of a bellows 200 and in the opposite direction by the pressure of a spring 201, the bellows 200 and the spring 201 being enclosed in a housing 202 suitably supported in any way relative to the valve casing 125. The bellows 200 is shown as a gas-filled bellows, and is connected by a tube 203 with a bulb 204 arranged within the cabin, so that cabin temperature variations may affect the fluid within the bulb and cause the expansion of the bellows 200 upon increases in cabin temperature and permit the contraction of the bellows on decreases in cabin temperature. It will be observed that when the piston 174 is in its retracted position and the levers 180 and 182 are in their fourth quadrant positions and the lever 185 is in first quadrant position, the lever 187 will be swung in such a manner that the bar 194 will be out of the range of possible contact by the pins 193, and, accordingly, the cabin temperature will directly control the position of the valve 126 and pass more or less of the air coming through the conduit 123 through the heat exchanger 130, depending up whether the cabin temperature is high or low. When the cabin temperature is high, more of the air will go through heat exchanger, and, accordingly the air delivered to the heat exchanger through the conduit 148 will be correspondingly cooled. When the cabin temperature is relatively low, more of the air through the conduit 123 will be bypassed through the space S¹ instead of passing through the heat exchanger 130. It is worth noting that at elevations where the supercharger is not operating compound, the air from the second stage is at a higher pressure (and therefore temperature) than the air from the first stage, as the latter is then operating unloaded.

The heat exchanger 147, as shown, is also of the shell, tube and baffle type and has the end of the inner course remote from the chamber 146 connected, as at 206, with the interior of the cabin. The end of the outer course which is nearer the chamber 146 is, in the preferred form of the invention from the system aspect of the latter, connected through a conduit 207 with a valve casing 208 in which there is rotatably supported a valve element 209 having a diametrically extending passage 210 and a right angle branch 211 communicating with the passage 210 at the latter's central portion. The valve casing 208 communicates with a passage 212 at a point diametrically opposite from the conduit 207 and also has a connection 213 at right angles to the axial line of the passages 207 and 212 and facing towards the right in Fig. 1. The passage 212 communicates freely with the atmosphere, and the connection 213 communicates with a valve device 214 in which a balanced type valve 215 is movable to control communication between the conduit 213 and a passage 216 which communicates in any suitable manner with the atmosphere. The position of the valve 215 is controlled by a bellows 218 which is connected by a tube 219 with a liquid filled chamber 220 arranged in the cabin at a suitable place. It will accordingly be evident that the left-hand end of the heat exchanger 147 will be variably connected with the atmosphere, depending upon cabin temperature, and have greater communication with the atmosphere the lower the cabin temperature. The right-hand end of the outer course of the heat exchanger 147 communicates through a passage 221 with a valve casing 222 in which there is rotatably mounted a three-way valve element 223 having a diametrically extending passage 224 and a branch passage 225 at right angles to and communicating with the passage 224 at the central portion of the latter. The upper end of the valve casing 222 is connected with a further valve casing 227 in which there is rotatably supported a valve element 228 which controls the communication of a passage 229 connecting the valve casings 222 and 227 with a conduit 230 which is connected to the branch 104 of the rammed inlet. The valve casing 222 has at its right-hand side a connection at right angles to the axial line of the connection 221 and the connection 229, with a combustion chamber 233 which is provided with an igniter in the form of a spark plug 234 and with a fuel nozzle 235 to which fuel (gasoline) is supplied from a fuel unit 236 whose construction will be later more fully explained. It will suffice at this point to say that the unit 236, which is representative of any type of device for providing fuel and air in proper ratio to a combustion chamber and with quantities varied with cabin temperature variations, is shown as including a motor operated by the differential in pressure between cabin and exterior pressure and driving a pump which delivers fuel to the nozzle 235, the quantity of fuel delivered to the nozzle being proportioned to the quantity of air delivered to the combustion chamber 233 by reason of the fact that as an increased volume of air is delivered to the pump operating motor and through the latter to the combustion chamber an increased volume of fuel is delivered to the nozzle, and all the air delivered to the pump operating motor enters the combustion chamber, as will be evident. The unit 236 has its air supply side 238 connected by a conduit 239 with a casing 240 which houses the valve portion of a cabin vent valve device 241 hereinafter more fully described.

The valve 228 is mounted on an operating shaft 243 which carries an arm 244, as shown in Fig. 2, connected with a rod 245 which is adapted to be moved in one direction by the expansion of a bellows device 246 and in the opposite direction by the action of a spring 247, the bellows device 246 and spring 247 being enclosed in a housing 248. The interior of the bellows device is connected by a tube 249 with a fluid filled bulb 250 in the cabin space 141. As the cabin temperature rises, the valve 228 will be moved in a direction to increase the communication between the conduit 230 and the right-hand end of the outer course of the heat exchanger 147.

The valves 209 and 223 are connected together for simultaneous operation. Each has an operating shaft 252 and each of these shafts carries an arm 253. These arms are parallel to each other and are connected by a link 254 so that they are maintained parallel to each other. The operating shaft of the valve 223 carries a worm wheel 255 with which a worm 256 engages. The worm 256 is rotatable by a suitable torque motor 257. The motor 257 is reversible and is connected with a suitable temperature-responsive switch mechanism 258 in the cabin space 141. When the cabin temperature is sufficiently high, circuits are established through the motor 257 which effect the positioning of the valves 209 and 223 as shown in Figs. 1 and 2. An opposite position of these valves is brought about by reversal of the motor 257 when the cabin temperature becomes too low. The motor 257 may be a torque-type motor and be brought to a stop at the desired opposite positions of the valves 209 and 223 by providing stops for the rotation of, say, the worm wheel 255, or limit switches may be employed if preferred. The igniter 234 is supplied with high voltage current, as from an induction coil (not shown), when the shift of the valves 209 and 223 from the position shown towards a position 90° counterclockwise from the one indicated commences to take place; and the igniter has its current supply interrupted, with the construction illustrated, when the valves commence to return towards the position shown in Figs. 1 and 2. Accordingly, if the thermostatic control device 220 is so selected that it will effect closure of the valve 215 when the control device 258 starts to return the valves 209 and 223 to the positions shown in Fig. 1 fuel supply will be interrupted as ignition is cut off, and further by proper selection of the characteristics of the devices 258 and 250, ignition prior to the initiation of delivery of fuel to the chamber 233 can be secured. The details of the control mechanism 258 and the source of current supply, which may to either batteries, or preferably a generator operated by an aircraft engine, are not illustrated as they may assume various forms and will be readily understood by those skilled in the art.

The detailed structure of some of the devices heretofore referred to in a general way may now be described before a general explanation of the mode of operation of the system is given.

*The multistage supercharger*

While superchargers of other types may be employed, and also different superchargers of the intermeshing rotor type, as for example those having rotors with lobes and grooves of the generated surface type, I have shown, as highly efficient for use in a system of the character which has been so far described, the supercharger 109 as consisting, in each stage thereof, of a pair of coacting rotors having special lobe and groove forms later described. As previously noted, this supercharger comprises a low pressure stage 108 and a high pressure stage 117, and the supercharger also comprises a casing 261. This casing is divided into a high pressure section and a low pressure section by a partition 262, which comprises a relatively thin portion 263, where the sides of the partition are recessed to provide intake grooves, and a thicker portion 264, where the full width of the partition is desired in order that space packings may be provided at the ends of the rotors. The casing has an internal enlargement at 265 at the intake end of the low pressure stage and a somewhat similar internal enlargement as at 266 for the high pressure stage. These enlargements provide intake spaces of more convenient form. The partition 264 is traversed by two bores 267 which provide seals for a pair of rotor shafts 268 and 269 respectively. Each of these rotor shafts, as above noted, carries a pair of rotors. A low pressure or first-stage rotor 270 having peripheral lobes 271 is mounted on the shaft 268 nearer the driven end of the latter. A coacting peripherally grooved rotor 272 having grooves 273 to coact with and receive the lobes 271 is mounted on the corresponding end of the shaft 269. These rotors are held in any suitable manner to their respective shafts and they are of such lengths as substantially completely to fill the space from the wider portion of the intermediate partition 264 to the chamber end plate 274 which is formed integral with a housing member 275 containing portions of the driving mechanism. For a substantial portion of its interior the walls of the casing 261 are a close, space-packing fit as at 276 for the first-stage rotors, the casing, where this space packing relation with the rotors is maintained, being generally of the form resulting from the overlapping for a relatively small portion of their circumferences of two cylinders. Other, high pressure stage rotors 277 and 278 are arranged near the opposite ends of the shafts 268 and 269, the lobed rotor 277 which has lobes 279 upon it being arranged on the shaft 268 and the grooved rotor 278 having grooves 280 being arranged on the shaft 269, the length of the rotors 277 and 278 being such as substantially completely to fill the space between the partition 264 and an end plate 281 which is herein shown as formed integral with a housing member 282 at the opposite end of the casing 261 from the driving housing 275. The lobes and grooves are helically disposed, and the rotors each have herein four lobes in the case of the lobed rotors and herein six grooves in the case of the grooved rotors. The lobes and grooves are herein shown as shaped at the leading sides thereof with substantially arcuate surfaces while the receding sides correspond to generated surfaces, these generated surfaces on the lobes generated by edges on the grooved rotors and these generated surfaces on the grooved rotors generated by the outermost edge lines of the lobes on the other rotors. The helices of the lobes and grooves are of opposite hand in the different stages and the high pressure stage has its spiral angle smaller than the spiral angle of the low pressure rotors in the construction illustrated so that the overall length of the high pressure rotors is somewhat less. Moreover, as will be apparent from Figs. 32, 33, 34 and 35, while the arcuate extent of the intake passages 283 and 284 of the low and high pressure stages respectively is essentially the same, the angular extent of the discharge opening 285 of the low pressure stage is substantially greater than the angular extent of the high pressure discharge opening 286 so that there is an additional feature contributing to the obtaining of substantially the same range of compression in the two stages, notwithstanding that one stage is longer, lengthwise of the supercharger, than the other.

As previously explained, rotors having their lobes and grooves formed with generated surfaces in a well known manner may be substituted for the rotors described without departing from the invention in its broader aspects in any way. The rotors shown are designed to operate with "space packing" with respect to each other as well as with respect to the casing; and, because of the length of the shafts 268 and 269, pairs of timing gears are provided near each end of the shafts, the timing gears at the driving end of the shafts being numbered 287 and 288, these timing gears being fixed to the shafts with which they are coaxial. The shaft 268 has a stub shaft 291 at its driving end. The space packing between the high pressure stage rotors 277 and 278 is maintained by rigidly fixing the high pressure (discharge) ends of these rotors to sleeves 293 and 294 which carry timing gears 289 and 290. The sleeve 293 is rigidly connected to the shaft 268 as by a pin 295 which connects the lobed rotor to the sleeve 293, and the sleeve 294 is similarly rigidly connected to the shaft 269.

The extent of the intake port 283, from the functional aspect, is with the proportion shown, such that the trailing edges of the grooves 273 and the spaces between the lobes 271 pass out of register with the intake port just before engagement or the start of compression within the tooth grooves and spaces begins. However, if a small amount of overlapping, so to speak, were to be desired, this would be permissible in view of the dynamic effect of the incoming air which is sufficient to offset the tendency towards the reversal of flow caused by the initial compression.

The fluid which is "sealed" in the successive progressively diminishing chambers between the rotors and the casing walls is substantially compressed when the valve 120 is closed with the result that there is no escape or discharge from the pockets in the rotors between the time when pairs of tooth spaces or grooves move out of communication with the intake and the instant that the leading edges of the cooperating spaces and grooves come into communication with the discharge 124. However, the valve 120 is so positioned and the port 296 which this valve controls is so positioned that, with the proportions heretofore explained, tooth pockets whose trailing edges are just ceasing to communicate with the intake are just about to commence to have their forward edges pass the edges of the opening 296 and establish communication with the latter, and as the trailing edges or tooth pockets approach their points of final communication with the opening 296, when the latter is open, they have their leading edges pass beyond the edge of the final discharge opening, whereby there is displacement, but not compression in sealed pockets, of fluid when the opening 296 is not closed by the valve 120. When the valve 120 is closed the ratio of compression in the two stages of the compressor is desirably, but not necessarily, approximately the same. Ratios of compression in each stage of between two and three to one are satisfactory for conditions often encountered; but in no sense should these values be regarded as limiting. For purposes of reference, the discharge 124 for the low pressure stage may be considered as an intermediate discharge for the supercharger while the discharge 153 for the high pressure stage may be considered as a terminal discharge.

The supercharger may be driven in any suitable manner as by a shaft 299 which may desirably be driven through a flexible non-backlash drive such as, for example, is disclosed in my abandoned application Serial No. 443,414, filed May 18, 1942; and this shaft is arranged in alinement with the rotor shaft 269 and is adapted to be connected to drive the latter by means of a drive shaft 300 with which it has a splined driving connection as shown at 301. The drive shaft 300 is journaled in a ball bearing 302 carried by a plural-part head 303 supported by and fixed to the housing 275. Surrounding a cylindrical hub portion 304 of the gear 288 is a bearing sleeve 305, and a cylindrical portion 306 at the right hand end of the drive shaft 300 rotatably surrounds the bearing sleeve and is journaled thereon. Keyed to the drive shaft is a member 307 having a number of recesses 308 formed therein receiving rollers 309 adapted, under proper circumstances, to clutch the member 307 to a cylindrically bored liner ring 311 keyed, as at 312, to the gear 288. The recesses 308 have relatively straight base surfaces 315 and radial surfaces 316. Through the latter surfaces project spring pressed plungers 317 adapted to act upon the rollers 309 and cause them to connect the members 307 and 311 on predetermined relative rotation between the latter members. Springs 318 act against cross pins 319 and move the plungers 317 against the rollers 309. The pins are supported in end-closure plate members 322 and 323, and the rollers have stems 324 loosely received in openings 325 in the plates 322 and 323. The plates 322 and 323 are supported to turn with the member 307. It will be noted, referring to Figs. 28 and 29, that if the member 307 be driven counter-clockwise, it will be connected by the rollers 309 to the liner ring 311 and through the latter drive the gear 288, and, by virtue of the connection of the gear 288 to the shaft 269, drive the rotor 272, while, through the meshing of gear 288 with gear 287 and the mounting of gear 287 on shaft 268, the rotor 270 will also be driven. If the gear 288 be driven counterclockwise at a greater angular rate than the member 307 it will not be connected to that member but may turn freely in the direction mentioned relative to it.

The shaft 268 has another shaft 291 connected with it. It will be noted that the shaft 291 is connected by means of a splined connector element 328 with the shaft 268. This connector element is hollow from end to end as at 329. The left hand end of the shaft 291, as viewed in Fig. 7, is journaled in a ball bearing 331 carried by the plural-part head 303 and carries a gear 287 somewhat smaller than the gear 287. A gear 333 somewhat larger than the gear 288 meshes with the gear 332 and is journaled by a ball bearing 335 on a cylindrical portion 336 of the drive shaft 300. The gear 333 also has a sleeve portion 337 internally splined at 338 and supported by a ball bearing 339 on a further cylindrical portion 340 of the drive shaft 300. Discs 342 connected to the sleeve portion 337 are interleaved with other discs 343 connected by splines 344 to the drive shaft 300 which has a flange 345 adjacent the bearing 339 serving as an abutment for the end one of the interleaved series of discs 342 and 343 when these are pressed together to connect the gear 333 to the drive shaft 300. A follower member 347, as shown in Fig. 27, is slidably supported on a packing ring 348 mounted on the shaft 300 and has an annular outer sleeve portion 349 with whose bore a peripherally packed plate 350 coacts to form a chamber 351 for the clutch applying hydraulic pressure. A ring 352 seated in an internal groove in the sleeve portion 349 provides an abutment for a flexed annular spring 353 whose opposite side presses upon the side of the plate 350, and the spring 353 normally maintains the follower member 347 in clutch unloading position.

When the clutch is loaded the gear 333 will be connected directly to the shaft 300 and will drive the gear 332 and so the gears 287 and 288 and thus the rotors 270 and 272; and because the gear 288 will then be rotated faster than the member 307 and in the same direction with the latter, there will simply be an overrunning clutch action and no tendency for connection between gear 288 and member 307.

When the drive shaft 300 is rotated counter-clockwise in Fig. 5 and the female rotors 272 and 273 turn in the corresponding direction while the male rotors turn in the opposite direction, air taken in through the intake connection to the low pressure stage will be entrapped between the casing and the rotors and be progressively moved, and if it remains entrapped, be compressed as it is moved to the discharge connection 124, while air entering the high pressure rotors through the intake 116 will also be compressed as it is moved, in the opposite direction longitudinally of the shafts 268 and 269, to the discharge connection for the high pressure stage.

Hydraulic means having a common operating fluid are provided respectively for effecting an automatic change in the driving rate of the rotors upon predetermined changes in the speed of operation of the supercharger and for controlling the position of the valve 120 upon predetermined changes in external pressure.

The base of the casing 261 contains a sump 360 between the lower wall of the rotor housing and an outer wall 361 forming an integral part of the casing 261. The sump 360 includes a portion 360$^s$ in the plural-part head 282 and is normally horizontal when the supercharger is horizontal. A pump 362 is positioned in the chamber 360$^s$ so that it is always partially submerged, and so that its intake is always submerged, in the horizontal position of the casing, in the oil in the sump. This pump, as shown in Fig. 25, includes a casing 363 having intersecting rotor chambers 364 therein in which are rotors 365 having intermeshing teeth 366 arranged at a slight angle to elements of a cylindrical surface in which the outermost points in the rotor teeth lie. An intake passage 367 conducts oil to the lower sides of the rotors 365, and this oil is carried around by the teeth 366 and is discharged to a discharge space 368 above the plane of the mesh line of the rotors 365. One of the rotors drives the other, and the first mentioned rotor is provided with a shaft 369, Fig. 8, which is driven through a train of gearing including a pinion 370 on the shaft 269, a gear 371 driven by the pinion 370 and driving a second pinion 372 herein shown as formed integrally with and coaxial with the gear 371, the latter pinion engaging and driving a gear 373 secured to the shaft 369. The discharge passage 368 communicates with a passage 375 opening into a bore 376 in a sleeve member 377 and passes through a strainer device 378, and from the latter by way of an annular passage 379 to a vertically extending passage 380 in the element 381 of the composite head 282. Passage 380 opens into an annular groove 383 whose opposite side opens into a passage 384, whose upper end opens into a chamber 385. This chamber constitutes a distribution point for oil for lubricating purposes and for operating the speed-changing clutch mechanism previously described and also for fluid for closing the valve 120. In line with the passage 384 there is another passage 386 opening upwardly from the chamber 385. This communicates with an annular groove 387 in a bushing 388 surrounding the shaft 268. This annular groove has continuously in communication with it obliquely disposed passages 389 opening into a chamber 390 which communicates with the hollow interior of the shaft 268 which delivers lubricant to and through the bore 329 of the connecting element 328 into the stub shaft 291 and through the latter into a chamber 391 formed in a head member 392 at the extreme left hand end of the supercharger as viewed in Figs. 7 and 8, from whence it is delivered through a suitable lubricant tube 393 to lubricate the gear couples previously described. After it is discharged over these gears, the lubricant passes downwardly within a chamber 394 and is conducted out of the casing back into the sump 360. As the lubricating arrangements for the driving gearing form no part of the subject matter specifically claimed in this application and correspond closely to those described in my copending application, Ser. No. 458,641, filed Sept. 17, 1942, further description at this point is unnecessary. The chamber 390 in the shaft 268 is separated by a partition 395 from a valve receiving bore 396. Passages 397, Fig. 18, connect the annular groove 387 with the bore 396 at points near the partition 395, and a further annular passage 398, formed in the bushing 388, is connected with the interior of the bore 396 by radial passages 399. The extreme right hand end of the shaft 268 supports a speed responsive governor 400 which serves, in conjunction with a spring 401 housed in the interior of a valve member 402, to vary the position of that valve member in the bore 396. This valve member is open from end to end, and the spring normally acts to thrust said valve towards the right in Fig. 18. The valve member 402 has a peripheral groove 404 adapted, in the position of the valve shown in Fig. 18, to connect the passages 397 and 399, and in the position shown in Fig. 20 simply to prevent any discharge of fluid through the passages 397. It has another and longer groove 405 which, in the position of Fig. 18, performs no function, but in the position of Fig. 20 connects the passages 399, through a slight annular enlargement 406 of the valve chamber, and ports 407 in the governor mounting, to a chamber 408 which communicates with the sump 360.

The governor includes fly weights 409 pivotally supported on transverse pins 410 in earlike portions 411 carried by the governor support. The weights carry adjustable screws 412 adapted to engage the right hand end of the valve member 402 and upon the attainment of the shaft 268 to a predetermined speed of rotation, the fly weights effect a movement of the valve 402 from the position shown in Fig. 18 to that shown in Fig. 20. This, in a manner shortly to be explained, will effect a reduction in the speed of the rotors, but not a reduction sufficient to effect a changed operation of the speed governor permitting the valve 402 again to move to a position for supplying fluid in the manner shown in Fig. 18 from the passages 397 to the passages 399, since the design of the governor is such that it becomes operative to force the valve 402 to the left only upon the attainment of a speed of the order of 7000 R. P. M. while, after once assuming the position of Fig. 20, a falling off of the speed to a rate of the order of 4000 R. P. M. is necessary before the weights will move in and permit the reestablishment of fluid delivery in the manner to effect a change in operation of the driving gearing. Now, the groove 398 is connected at its lower side with a passage 413 which opens through an opening 414, Fig. 16, into the interior of the bore of a valve receiving bushing 415 in which there is a rotatable valve 416 which is adjustable by a handle 417. This valve, which is primarily used for testing purposes, normally occupies the position shown in Figs. 16 and 17, in which position a diametric passage 418 connects the opening 414 with the passage 419 and with an annular groove 420 provided in part in a bushing 421 surrounding the right hand end of the shaft 269 and in part in the periphery of that shaft. This annular groove is connected by radial ports 422 with a chamber 423 near the right hand end of the shaft 269; and a tube 424 extending axially of the shaft 269 leads to the left hand end of this shaft where it is centered by a suitable fitting 425.

Before describing the mechanism to which this tube delivers fluid, it may be pointed out that the valve member 402, at speeds of the shaft 268 below a predetermined number of R. P. M. will be in the position shown in Figs. 8 and 18, and will connect the pump discharge, via the ports and passages previously described, with the tube 424, but that at speeds above such a predetermined number of R. P. M., the valve member 402 will assume the position shown in Fig. 20 and cut off communication completely between the passages 397 and 399 and connect the latter passages, and so the interior of the tube 424, back to the sump through the chamber 408. It may be noted that the valve 416 may be turned at will either to provide a direct and continuous communication between the chamber 385 and the passage 419 through a groove 426 in the valve, or when oppositely turned from central position may effect a continuous venting of the passage 419 through another peripheral groove 427 to a space 428 communicating through a passage 429 with the chamber 408.

Within a stepped bore 430, Fig. 27, within the drive shaft 300 there is arranged a hollow plunger 431 which is provided at one end with a perforated flange 432 adapted to seat against a split ring 433 secured within the inner wall of the drive shaft 300. The plunger member 431 is engaged by a spring 434 which reacts against a shoulder 435 within the drive shaft, and a thimble 436 closes the left hand end of the chamber within which the element 431 is movable. The interior of the chamber communicates through obliquely radially extending passages 437 with the outside of the drive shaft between the ball bearings 302 and 335; and radially obliquely extending passages 438 connect the interior of the stepped bore 430 at the right hand end of the plunger member 431 in communication with the chamber in which the member 350 moves at the right hand side of that member.

The mode of operation of the mechanism which has just been described is as follows: When the compressor is started, a driving connection is immediately established between the shaft 300 and the gear 288, and the pump 362 commences to deliver fluid through the passage 375, the bore 376, the strainer 378, the annular space 379, the passage 380, the annular groove 383, the passage 384, the chamber 385, the passage 386, the annnular groove 387, the passages 397, the groove 404, the passage 399, the groove 398, the passages 413, 418 and 419, the annular groove 420, the radial passages 422, the chamber 423 and the tube 424 to the bore 430 where it will pass through the passages in the flange 432 and through the radial passages 438 and bring the clutch discs 342 and 343 into contact with each other. As the oil continues to pass through the tube 424 the member 431 moves to the left, compressing the spring 434, and the compression of this spring is so determined that the clutch pressure will be gradually applied as the member 431 moves to the left. When this member reaches its extreme left hand position, the clutch discs may be firmly pressed against each other, and drive with the rotors at the higher speed, with the gear 333 as the driving element, will be effected. This high speed drive will be continued until the speed of the compressor builds up to such a degree that the valve member 402 will be shifted by the governor and then the slow speed drive between the shaft 300 and the compressor will be initiated.

The control for the valve 120 may now be described. The chamber 385 has a laterally extending passage 441, Fig. 15, communicating with it. The communication of the passage 441 with a passage 442, which extends parallel to but oppositely with respect to the passage 441, is governed by a spring loaded valve 443. This spring loaded valve operates to maintain a sufficient pressure in the chamber 385 under all circumstances when the compressor is running to insure the operation of the speed change mechanism. Passage 442 opens through a longitudinal slot 444 into an annular chamber 445 surrounding the sleeve 415, and at the opposite side of said sleeve another longitudinally extending slot 446 connects the annular chamber 445 with a passage 447 which is alined with the passage 442. This last passage has a bore 448 communicating with it, and a valve 449 is reciprocable in this bore and controls a side vent 450 which is connected with the space 408. The valve 449 is suitably spring loaded and serves to regulate the pressure in the passage 447. Passage 447 communicates through a port 451 with the bore 452 of a valve seat member 453 which is connected by another passage 455 to a passage 456, Fig. 10, leading to a servomotor 457 which is adapted to close the valve 120 and which passage 456 has a branch 458, Fig. 3, which leads to the port 178 for supplying fluid to the cylinder 179 to actuate the piston 174 and shift the position of certain of the valves which have been heretofore described. The servomotor 457 comprises a cylinder 460 in which a piston 461 is reciprocable, said piston normally maintained in outer position by a spring 462 and connected by a stem 463 with the valve 120 which is mounted for swinging movement about a pivot mounting 464. It will be understood that if escape of fluid to the sump from the bore 452 be prevented, a supply of hydraulic pressure to the servo-motor 457 and to the cylinder 179 will take place sufficient to cause a movement of the piston 461 in the cylinder 460 in a manner to close the valve 120 and a movement of the piston 174 in the cylinder 179 in a manner to actuate the arm 171 to the position shown in Fig. 3. Otherwise, the valve 120 will remain open and the valves 113, 145 and 126 will remain in their respective positions occupied at levels of the aircraft below 20,000 feet. To repeat, if escape of fluid from the bore 452 is interrupted, the valve 120 will be closed and the piston 174 will be moved at once to the position shown in Fig. 3.

To control the venting of pressure from the bore 452 back to the sump, and to maintain a free venting at heights below approximately 20,000 feet, and to interrupt venting sharply when approximately that elevation is attained, the following arrangement has been illustrated. The valve seat member 453 is provided with a plurality of ports 466, Fig. 23, opening through a surface 467 which provides an annular valve seat 468, and the member 453 has, in addition, a central guide extension 469. Slidably mounted upon this extension is a valve element 470. The movement of this valve element in an opening direction is limited by a sleeve portion 471 formed on a threaded sleeve member 472 which is supported by a further sleeve mounting element 473 carried by a wall of the housing element 381. An adjustable closure element and spring tension regulator 474 engages a spring 475 which acts upon the valve element 470 and normally tends to seat it. Connected to the valve 470 and to the sleeve member 472 at opposite sides of the sleeve portion 471 are bellows devices 476 and 477 bounding a chamber 478 in which the sleeve 471 is enclosed, and this sleeve is perforated so that free communication may at all times exist throughout the interior of the chamber 478. The chamber 478 is evacuated, and the compression of the spring 475 is so determined that until the pressure acting upon the exterior of the bellows arrangement falls to a predetermined low value, the valve 470 will be held firmly open against the stop sleeve 471. When, however, the pressure in the casing 473 falls below a predetermined value, the valve 470 will promptly seat and interrupt the discharge of fluid back to the sump and cause the building up of such a pressure in the bore 452 as to cause the valve 120 to close and the piston 174 to move to the position shown in Fig. 3 and shift the several valves which are controlled thereby. It will be noted that the walls of the casing 473 are perforated as at 479 to permit the fluid passing from the passages 466 to flow freely back to the sump through the chamber 408. The chamber 408 is connected to external pressure— pressure outside the cabin—in any suitable manner as through a connection shown in part at 480. The setting of the spring 475 is such that the valve 470 is normally open at heights of the aircraft below 20,000 feet and the valve 470 is of the "overbalanced" type, being of the sharp opening variety so that when the valve 120 is to open it may do so sharply and similarly may be closed in the same manner. The guide extension 469 is traversed by a passage 482 so that fluid from the bore 452 passes from the latter through the passage 482 to the interiors of the sleeve member 472 and the closure member 474. When the valve 470 is seated, fluid supplied under pressure through the passage 482 acts against the outer end of the valve and counteracts the increase in pressure on the inner end of the valve produced by the fluid acting through the ports 466. No more extended discussion of the mode of operation of the supercharger and of the controls therefor which are here described is necessary at this point.

The cabin pressure vent valve

While any suitable device may be provided for regulating the cabin pressure mentioned, I have chosen to show, for purposes of illustration, a device which is fully disclosed in my copending application Ser. No. 468,938, filed Dec. 14, 1942, and which is claimed therein. This device is adapted to permit the cabin pressure to fall off at substantially the same rate that external pressure falls until the aircraft reaches a desired elevation, such as 8,000 or 10,000 feet. Thereafter, this device is adapted, until a considerably greater height is reached, say 30,000 feet, to maintain the cabin pressure relatively constant at whatever external pressure prevails at the height at which the following of external pressure by cabin pressure ceases to be desired. When the aircraft goes above the height of 30,000 feet, this device will operate, over perhaps another 10,000 feet of increase in elevation, to reduce the cabin pressure as elevation increases in such a manner that there will be maintained a constant pressure differential between cabin pressure and outside pressure. In other words, it will prevent the cabin pressure from being more than a predetermined amount above external pressure at any time. And if the aircraft is to operate above 40,000 feet, for example, then the nature of the control will be changed so that there will be maintained a constant ratio between cabin pressure and outside pressure from 40,000 feet on up.

This device need not be described in minute detail here in view of its full disclosure in the copending application Ser. No. 468,938, and it will suffice to point out that it includes a valve 483 of the approximately balanced type whose position is adjusted and determined by a bellows device 484, one end of which is fixed, as at 485, and whose other end is connected through an end closure plate 486 and a stem 487, to the valve 483. The valve 483 is movable relative to a stationary seat 488 and controls the flow from the interior of the cabin through a screen 489 and passages 490 to a conduit 491 which is connected through any suitable connection 492, preferably terminating, say, at the rear of a wing of an airplane, with external pressure. The pressure within the bellows 484 is controlled by a pair of pilot valves 493 and 494. Each of these is designed to control the connection of the interior of the bellows 484, through suitable passages 495 opening into the interior of the chambers 496 into which the pilot valves extend, ports 497 controlled by the pilot valves, a chamber 498 and conduit means 499 which leads into the passage 491, with external pressure. Each of the valves has clearance about it so that cabin pressure may pass along the stem portions of the valves and pass either into the interior of the bellows or to the exterior of the cabin, depending upon the positions of the valves. The valve 493 is controlled by an evacuated bellows 500 with which a spring 501 coacts. Appropriate means, generally designated 502, and including an internal thread 503 on a manually rotatably adjustable element 504 and pins 505 carried by a spring follower 506, is arranged to vary the degree of compression of the spring 501 and thereby to raise or lower the value at which cabin pressure will become insufficient to maintain the evacuated bellows 500 collapsed against the expanding force exerted thereon by the spring 501. As long as the cabin pressure is great enough to maintain the evacuated bellows 500 collapsed, the valve 483 will be maintained open in such a manner that cabin pressure will fall off substantially at the same rate that external pressure falls off. When, however, the predetermined height of 8000 or 10,000 feet, or whatever may be selected, is attained, the cabin pressure will have diminished sufficiently so that the spring 501 will be able to expand the bellows and move the valve 493 to its seat. This will result in a partial closure of the cabin vent valve 483; and cabin pressure will thereupon tend to rise, with a resultant action on the evacuated bellows which will bring about such a control of the valve 483 that, until a predetermined higher elevation, such as 30,000 feet is reached, the valve 483 will have its position adjusted to keep the cabin pressure substantially constant. When this desired higher altitude is attained, the pilot valve 494 takes over control, and this pilot valve is governed, as more fully explained in my copending application Ser. No. 468,938, by a pair of controls. From 30,000 to 40,000 feet, the control is by a bellows device 510 whose outer end is mounted on a plate 511 which is carried by other bellows devices which I shall shortly describe. A spring 512 constantly tends to maintain the bellows 510 expanded and to seat the pilot valve 494. The exterior of this bellows device, and its lower end, formed by a flange 513 on a stem 514 carrying the pilot valve 494, are constantly subjected to cabin pressure, while the interior of the bellows is in communication through a port 515 and the space surrounding the bellows later described and the conduit means 499 with external pressure. The flange 513 has a groove on its face at 517, so that even when the plate 513 is engaging a surface 518 which is movable with the other bellows devices shortly to be described, there is communication between the interior of the cabin and the space surrounding the bellows 510. It will therefore be evident that when the aircraft attains to the predetermined desired height, say 30,000 feet, the reduction of the pressure within the bellows 510, by reason of the venting of pressure therefrom via the port 515, will enable cabin pressure acting on the outside of the bellows to overcome the spring 512 and cause the pilot valve 494 to open, thus venting pressure from within the bellows 484 and permitting a partial opening of the valve 483, so that the cabin pressure will again commence to fall. The parts just described will then function to maintain a constant pressure differential between cabin pressure and external pressure as the aircraft continues to rise until a substantially higher elevation is reached, at which time the other control of the pilot valve 494 will take over. This other control includes a pair of bellows devices 520 and 521 whose lower ends in Fig. 41 are connected to a stationary annular member 522 and whose upper ends are connected to the support 523 for the plate 511 and to an integrally connected support 524 connected with the first mentioned support by a sleeve portion 525. The space between these bellows is evacuated, and, as will be observed, a larger exterior area is exposed to external pressure, while a smaller interior area is exposed to cabin pressure, and the ratio of these two areas may be the same as the desired ratio between external pressure and cabin pressure at the chosen height of 40,000 feet. Accordingly, as soon as this height is exceeded, the valve 494 will be unseated, and as long as the plane operates at heights above 40,000 feet, the control of cabin pressure will be regulated by this valve under the control of the evacuated bellows 520, 521; and a constant ratio between cabin and external pressure will be maintained; and the actual differential in inches of mercury between cabin and external pressure will become less than existed at the elevation of 40,000 feet; wherefore, the surface 518 will continuously engage the flange 513 and the whole control will be by the composite bellows 520, 521, until the aircraft again moves below 40,000 feet. It may be noted that the member 522 has a sleevelike portion 526 which is adapted to limit contractive movement of the bellows device 520, 521 when the bellows device 510 has been partially compressed, at elevations between 30,000 and 40,000 feet, and unseated the valve 494.

Certain cabin temperature increasing devices

Two devices are provided for effecting temperature increases in the cabin air, the back pressure valve device 152 and the heating unit 236. The back pressure valve device 152 can, as will hereinafter be explained, be rendered completely inoperative and the heating function may then be performed just as if this device were not present. On the other hand, both devices may be used under special circumstances if desired. These devices will now be described in turn.

The variable back-pressure valve

The variable back-pressure valve mechanism, as previously noted, includes a casing 538, Fig. 40, in which there is arranged a back-pressure imposing valve 539 whose position is both manually controllable and automatically controllable. The valve 539 is of the approximately balanced type and includes a generally conical portion 540 and an outer, peripheral, generally cylindrical portion 541. The portion 540 is traversed by ports 542 to balance the pressures at opposite sides of the valve. The cylindrical portion 541 has an annular inner flange portion 544 formed thereon carrying pins 545 which are adapted to slide in straight slots 546 formed in a portion 547 of the valve casing. A sleeve portion 548 (see Figs. 40 and 40a) has a plurality of elongated, generally triangular openings 549 formed therein into which the pins 545 project. The sleeve portion 548 is rotatively mounted within the portion 547 of the casing and may be turned relative to the latter by means of a handle 550. In view of the fact that the hypothenuse of the generally triangular openings 549 faces upward, it will be evident that rotation of the sleeve 548 may cause manual opening of the valve 539, but it is not possible to close the valve 539 by this control. Thus this manual control can lock the valve 539 out of operation when desired.

The valve 539 is carried by a tubular stem portion 552 and is connected to that stem portion and to a spaced plate 554 by nut and bolt means 555. The stem is guided for reciprocatory motion in a guide structure 556 carried by an inner wall portion 557 forming a part of the valve casing. To this latter portion there is attached a housing element 558 which encloses a bellows device 559 attached in sealing relation at its lower end to the plate 554, while its upper end is attached in sealed relation to an annular member 560 between which and a hollow inner member 561 a flange upon the housing 558 is clamped. The bellows 559 is continuously subjected through conduit means 562 to the pressure in the throat of the valve casing 538 at the outside of a valve seat 563 with which the valve 539 is adapted to cooperate. In other words, the outside of the bellows 559 is subjected to the pressure in the conduit 153. Its interior is subjected to a variable pressure. This variable pressure is determined by the relative rates of admission of pressure to the bellows from the conduit 153 and of discharge of pressure from the bellows. The member 561 supports a domelike enclosing member 564 which houses bellows devices shortly to be described which control the position of a pilot valve 565. Another pilot valve 566 has its position regulated by a spring 567 and a thermostatically expansible operating device 568. Each of the pilot valves 565 and 566 has associated with it a valve seat forming element 569. Each of these elements has an axial passage 570 for which the associated pilot valve is not a snug fit, whereby pressure from the conduit 562 may freely pass along between the pilot valve and the wall of the passage 570. Each of the valve seat members has a central chamber 571 into which the associated passage 570 opens and which communicates through a passage 572 with passage means 573 which is connected with external pressure through a conduit 574. It will be noted that this same external pressure connection communicates with the interior of the domelike housing member 564. Each of the chambers 571 communicates through a passage 575 with the space inside the bellows 559. The pilot valve 566 has a head 576 against which the spring 567 acts; and a bell crank lever device 577 has one arm thereof 578 positioned to act on the head 576. The other arm 579 of the bell crank is engaged by a spring pressed plunger 580 actuated by a spring 581 whose compression is variable by means of a follower 582. Were there nothing else to oppose the forces exerted on the arm 579 by the spring pressed plunger 580 the pilot valve 566 would normally be closed; and this would mean that the pressure within the bellows 559 would build up, by reason of the flow of pressure along the stem of the valve 566 and through the chamber 571 and upper passage 575 in Fig. 40 into the bellows. This would mean that the valve 539 would close, and accordingly the back pressure imposed on the supercharger would build up, which would mean that the air would be increased substantially in temperature before its admission to the cabin. The temperature responsive bellows 568 has an end portion 584 which acts on the opposite side of the bell crank lever arm 579 and tends to move it in opposition to the spring 581, and the bellows 568 is connected by a tube 585 to a fluid filled element 586 in the cabin, so that, when the cabin temperature increases, the bellows 568 will be expanded and the bell crank 577 moved in opposition to the action of the spring 581 to permit the spring 567 to open the pilot valve 566 and thus permit an opening movement of the back pressure imposing valve 539.

From what has been said, it will be apparent, therefore, that whenever the cabin temperature tends to become undesirably low the pilot valve 566 will be moved in a direction to effect closing of the back pressure valve 539, with a resulting additional heating of the air entering the cabin. When the cabin tends to get undesirably warm the back pressure on the supercharger will be reduced, so that the air entering the cabin will not be heated so much, thereby giving the cabin a chance to cool.

As it is desirable that there shall, under no circumstances, be exceeded a predetermined maximum differential between supercharger back pressure and external pressure, and that also there shall be no exceeding of a predetermined maximum ratio between supercharger discharge and intake pressures, I have provided appropriate controlling means for the pilot valve 565 to attain these ends. The pilot valve 565 is herein governed by the following devices. An annular member 590, somewhat T-shaped in radial cross section, is mounted upon the member 561 at the lower end of the latter. The member 590 includes a cylindrical stop portion 591, an outer flange portion 592 and an inner flange portion 593. Suitable bellows devices 594 and 595 are brazed, or otherwise held, at their upper ends, to the flanges 592 and 593, and at their lower ends these devices are secured to an annular member 596. The space between these bellows is evacuated, and the member 596 includes an end flange 597 to which the end of the bellows 594 is secured, a cylindrical or sleeve portion 598 and a second radially but inwardly extending flange portion 599. To this latter portion is secured the lower end of the bellows device 595. The radial flange 597 is adapted, in the relatively collapsed condition of the bellows, to engage the end of the stop portion 591. The lower end of the sleeve portion 598 carries an annular support member 601 within which there is mounted a circular plate 602 carrying a guide sleeve portion 603. Slidable within the guide sleeve 603 is a stem 604 having at its upper end a socket 605 in which the pilot valve element 565 is mounted with a limited freedom of movement laterally, as by mechanism such as is shown in Figs. 42, 43 and 44. The holding arrangement for this pilot valve is illustrated in detail in my Patent 2,392,178 granted Jan. 1, 1946. The stem 604 has, between its ends, and, in the construction shown, approximately midway between its ends, a radial flange 607. This flange has a seating surface 608 which is adapted to engage a surface 609 on the lower side of the flange portion 599 of the member 596. A shallow radial groove 610 in the peripheral portion of the flange 607 maintains communication between the space between the bellows 595 and the upper end of the stem 604 and the space enclosed by the sleevelike portion 598 of the member 596, even when the surfaces 608 and 609 are in contact. Between the member 601 and the flange 607 there extends a suitable bellows device 611, suitably connected in sealed relation to the flange and to the member, and a spring 612 of appropriate strength acts upon the flange and upon the plate 602 and tends to move the stem 604 in a direction to cause the pilot valve 565 to seat. It will be observed that the plate 602 is traversed by one or more openings 613 so that the interior of the bellows device 611 is in constant communication with external pressure through the interior of the casing 564 and the passage 573.

As just noted, the space within the bellows device 611 is continuously connected with external pressure; and the space above the flange 607 and also that surrounding the bellows device 611 is subjected to the pressure from within the conduit 153 at all times. The spring 612 is so proportioned that its pressure on the flange 607 is just equal to the difference between supercharger discharge pressure and external pressure applied to the effective area of the bellows device 611 when the maximum desired pressure differential between supercharger intake and discharge pressure is reached.

The maximum desired pressure differential between supercharger intake and discharge pressure may well be the same as the maximum permitted pressure differential between external pressure and cabin pressure as governed by the cabin vent valve 483; and as the maximum desired pressure differential between cabin pressure and external pressure is assumed to be that of the difference in absolute pressure at a height of 10,000 feet and the absolute pressure at 30,000 feet, respectively 20.58 inches of mercury and 8.87 inches of mercury, the control devices for the pilot valve 565 may advantageously be so constructed that when a difference in pressure equal to approximately 11.71 inches of mercury develops, the pilot valve 565 will open and, by venting pressure from within the bellows 559, will reduce the back pressure on the supercharger. The desirability of having the same maximum pressure differential established for the control of the pilot valve 565 which exists in connection with the cabin vent valve, will be apparent when it is considered that when the aircraft is operating with the control for the valve 539 rendered inoperative and with this valve held wide open, the maximum pressure differential which will be imposed on the supercharger under the control of the cabin vent valve will then be the same as can be imposed by the automatic control for the back pressure valve. Of course, it will be understood that the maximum pressure differential between supercharger intake and discharge may be attained at much lower altitudes, by reason of the operation of the thermostatic control for the valve 539 than would occur were this back pressure imposing arrangement not present.

It is also desirable that the same maximum pressure ratio limitation be imposed on the valve 539 that is imposed by the cabin pressure vent valve. For, just as it is important that the cabin vent valve shall be operative at heights, for example above 40,000 feet, to limit the maximum pressure ratio between cabin pressure and external pressure (supercharger discharge pressure and supercharger intake pressure when the valve 539 is wide open), so it is important that the supercharger shall not be overloaded by permitting the imposition of back pressures in excess of cabin pressure on the supercharger great enough to establish compression ratios in excess of the desired limit, when the aircraft is flying at lower altitudes. When the aircraft is at a height of 40,000 feet, the external pressure will have fallen to a value of approximately 5.54 inches of mercury while the cabin pressure will still be equal to approximately 5.54"+11.71", or about 17.25 inches of mercury. There will therefore be a compression ratio of something more than three to one necessary to raise outside air at 40,000 feet to cabin pressure. If it is desired to prevent this compression ratio being exceeded when the aircraft goes above 40,000 feet, it is also desirable to prevent that compression ratio being exceeded when the aircraft is below 40,000 feet, and it will be obvious that it would be easily possible to exceed such a ratio at much lower heights by placing back pressure on the supercharger discharge.

In view of the presence of the groove 610, the pressure in the conduit 562 acts upon a constant area, regardless of whether the surfaces 608 and 609 are in contact with each other, in a direction to move the members 596, 601, etc., in a direction to open the valve 565, and external pressure acts on a larger but constant area tending to move the members 596, 601, etc. in a direction to close the valve 565. The two areas mentioned, respectively exposed to supercharger back pressure and to external pressure, are desirably so determined that their ratio to each other will be the same as the ratio of external pressure to cabin pressure at the chosen height of 40,000 feet, namely 5.54 to 17.25. Accordingly, as soon as this ratio between the pressure in the conduit 153 and external pressure is attained, at whatever height it be attained, the valve 565 will be unseated and the imposition of additional back pressure on the supercharger will be prevented. It will be noted that except as the same may be open to prevent the imposition of an undesired maximum differential in pressure between intake and discharge pressures on the supercharger, or the exceeding of a maximum compression ratio between supercharger intake and discharge pressures, the valve 565 will remain closed and thus the cabin temperature, through the governing of the position of the pilot valve 566, will maintain the primary control on the supercharger discharge, but the amount of air that can be bled past this valve when it is open, through its respective passage 574 into the bellows 559, will not be sufficient to prevent the opening of the valve 539 when the pilot valve 565 establishes a connection between its associated passage 575 and the atmospheric connection 574.

The heating unit

Figure 36:
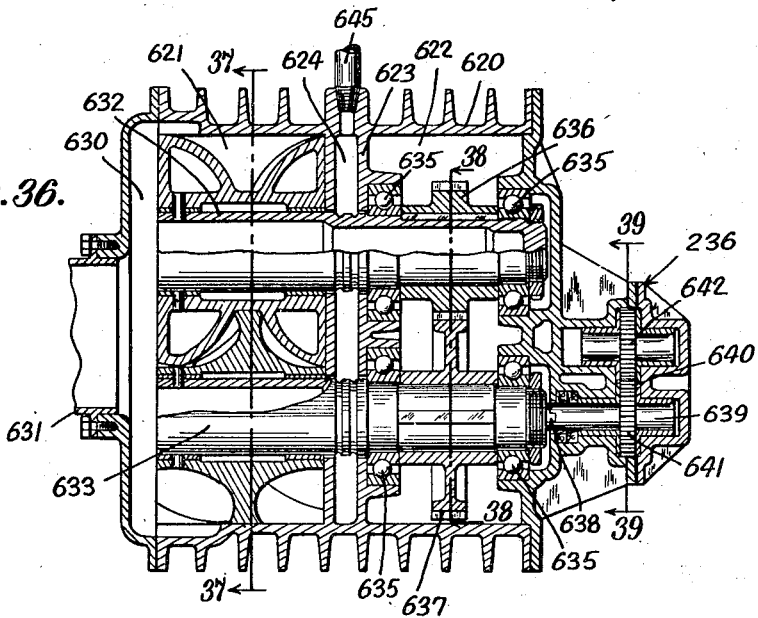
Fig. 36 is an enlarged central horizontal sectional view on the plane of the line 36—36 of Fig. 1, through a preferred form of heating unit oil pump and the drive for said pump.
Figure 37:
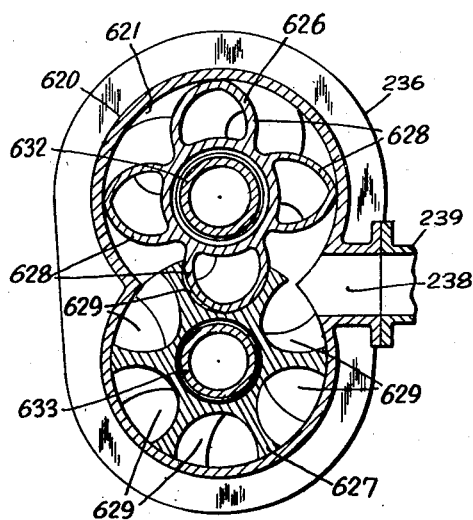
Fig. 37 is a vertical sectional view on the plane of the line 37—37 of Fig. 36, through the air motor end of the unit shown in Fig. 36.
Figure 38:
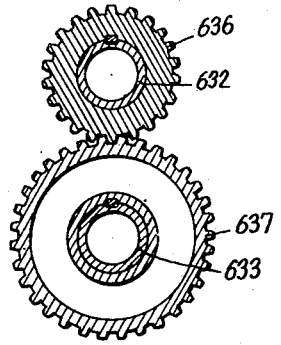
Fig. 38 is a section on the plane of the line 38—38 of Fig. 36, showing timing gears.
Figure 39:
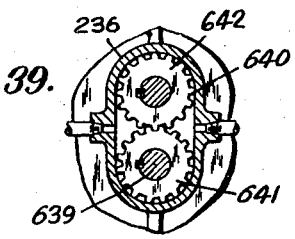
Fig. 39 is a sectional view on the plane of the line 39—39 of Fig. 36, through the oil pump.

The liquid fuel supply unit 236 shown in Figs. 1 and 36 comprises a casing 620 divided into two chambers 621 and 622 by an intermediate hollow partition 623 having a chamber 624 therein. The chamber 621 is in the form of a pair of cylinders which overlap with each other along a chord of approximately 90° of arcuate extent, thus providing a casing for a pair of rotors 626 and 627. The rotor 626 is lobed, and, like the lobed rotors of the supercharger, has four lobes 628. The rotor 627, like the grooved rotors of the supercharger, has six grooves 629. These rotors are adapted to operate with space packing, both with respect to each other and with respect to the bores in which they turn; and operating medium is adapted to be admitted through the passage 238 to said rotors adjacent the partition 623 at points where the grooves and lobes coact to form pockets which increase in volume as the rotors turn. The opposite ends of the rotors are in free communication with a common exhaust chamber 630 which communicates through a conduit-forming element 631 with the lower end of the combustion chamber 233. The spiral angle of the rotors is desirably such that the operating fluid does not work expansively in the motor, but instead, approximately as each working space comprised in part of volumes included between lobes and within grooves has communication established, at the outer ends of the rotors, with the discharge space 630, these working spaces leave communication with the inlet. The rotors are each mounted on shafts, the shaft for the rotor 626 being designated 632 and the shaft for the rotor 627 being designated 633, and the bearings for these shafts are located only in the chamber 622 in which, as may be observed, there are provided multiple ball bearings 635 for rotatably supporting each shaft. Each shaft has fixed to it between the ball bearings 635 a gear, the shaft 632 carrying a gear 636 and the shaft 633 carrying a gear 637. These gears are timing gears and maintain the correct angular relations between the rotors, so as to prevent their running in contact with each other. The shaft 633 has a clutch 638 connecting it to the drive shaft 639 of a gear type gasoline pump 640. This gasoline pump has intermeshing pump gears 641 and 642, the latter driven by the former, and fuel delivered to the pump intake from any suitable source (not shown) through a conduit 643, Fig. 1, is carried around by the teeth of the pump gears and delivered to a conduit 644 which leads the nozzle 235. The displacement of the pump 640 is designed in such a manner that the gasoline delivered by the pump will be in suitable volume for combustion by the air which passes through the motor which drives the pump and which enters the combustion space 233 through the conduit-forming means 631. Thus, if the quantity of air which drives the pump is small, the quantity of gasoline delivered to the nozzle 235 will be correspondingly small, whereas if a large volume of air passes through the pump driving motor and drives it at a rapid rate, a correspondingly large volume of gasoline will be delivered to the nozzle. The mode of operation of this device will be easily understood from what has been said. The operating fluid for effecting drive of the rotors 626 and 627 comes from within the cabin and is delivered through the conduit 239 from the housing 240 which surrounds the automatic cabin vent valve. Thus, the air which is to be used to operate the gasoline heater is that air which is ready to leave the cabin in any event. Having operated the rotors and driven the gasoline pump, the air passes through the conduit-forming means 631 into the throat of the combustion chamber 233 at which point the gasoline delivered by the pump 640 is sprayed into the moving air stream and is ignited by the igniter or spark plug 234. The combustion products pass through the valve 223 which is at that time in a position turned counterclockwise 90° from the position shown in Fig. 1, and, passing through the passages 224 and 225 in the valve, enter the outer course of the heat exchanger through the connection 221, and, after passing through this heat exchanger, discharge through the opening 207 into the passage 211 in the valve 209 which also occupies a position turned counterclockwise 90° from the position shown in Fig. 1, and then pass through the passage 210, also in the valve 209, to the connection 213 where the products of combustion pass the valve 215 and discharge through the conduit 216 to atmosphere at any point, as at the trailing edge of a wing of an airplane. The position of the valve 215 being controlled by the bellows 218 whose degree of expansion is governed by the thermostat 220 in the cabin and the rate of flow of the air from the cabin through the pump driving motor being governed by the position of the valve 215, it will be evident that when the cabin is relatively warm there will be little or no air passing the valve 215 and accordingly little or no air driving the fuel pump, and so little or no combustion. When, however, the cabin is cold the valve 215 will be relatively wide open and the fuel pump will be driven fast and a relatively considerable amount of heat will be produced by the combustion of the substantial amounts of gasoline burning, and accordingly the warming up of the cabin will be augmented. It will be observed that the chamber 624 is continuously connected by a conduit 645 with the interior of the cabin, and therefore cabin air at all times provides, as it were, a fluid seal between the rotor chamber 621 and the gearing chamber 622. While this is of less importance in this preferred embodiment of the fuel pumping unit it plays a valuable function in the modified pumping unit which will later be described.

It will of course be understood that all of the return lines to the outer air, such as 155, 212 and 216 and 574 will open through a surface of the aircraft at points, or at a common point, where there will be at least no obstruction to flow, and, if desired, an evacuator effect.

While I have shown a liquid fuel burning arrangement for heating the air flowing through the heat exchanger 147, it will be evident that, if desired, the chamber 233 may simply be connected with the exhaust line of an aircraft engine so that the exhaust products may be passed, in the proper position of the valves 223 and 209, through the outer course of the heat exchanger 147.

General mode of operation

From the foregoing description, the mode of operation of the system of Fig. 1 will be readily apparent. When the aircraft is ready to take off the supercharger 109 will be running and the blower 151 will be running and circulating a volume of air substantially equivalent to the maximum volume required to be passed through the cabin for pressurizing purposes. Whether the air displaced by the blower will be passed through the heat exchanger 130 or through the heat exchanger 147 will depend on the position of the valve 145, and while the aircraft is on the ground the position of this valve will be opposite that shown in Fig. 1, and accordingly the air from the blower will be passed through the heat exchanger 147 and returned to the cabin through the conduit 206. The supercharger is of course operating with the valve 120 open, and accordingly there is virtually no compression of the air in the first stage thereof except such as may exist by reason of back pressure, and the second stage of the supercharger is operating single stage because the valve 113 is then in the position opposite that shown in Fig. 10.

The air taken into the low pressure stage 108 will be delivered, as stated, through the same without compression therein, and this air will be delivered to the conduit 123 and will be distributed by the valve 126 between the heat exchanger 130 and the space $S^1$ in accordance with the temperature conditions in the cabin, the valve 126 being thermostatically controlled at this time. When the cabin is relatively very warm the temperature control bellows device 200, 204 will position the valve 126, as shown in Fig. 1, and the discharge from the first stage will pass through the outer course of the heat exchanger 130 and from the discharge end of the latter into the conduit 133. As the valve 113 is at this time in a position preventing the entrance of air from the space $S^1$ to the second stage 117 of the supercharger, the air discharging from the outer course of the heat exchanger 130 will be discharged past the valve 158 and through the conduit 155 to the outside of the plane. The valve 158 will be open sufficiently to accomplish this discharge for reasons which will shortly be explained. The second stage 117 of the supercharger is concurrently taking in air from the inlet 101 past the valve 113 whose passage 114 then connects the conduit 103 with the intake 116 of the second stage 117 of the supercharger. This air, after compression, will be delivered through the conduit 153. The mass flow of air in this conduit will be sufficient to cause the valve 158 to be maintained full open under these conditions. The air discharging through the conduit 153 will pass the variable back pressure valve 152 which would normally be held open in any event by its automatic temperature responsive controlling means, but which may, in addition, be held open by the manual control means thereof at this time if desired. The discharge from the second stage of the supercharger will then pass through the conduit 148 and past the valve 145, whose position will at this time be at right angles to the position shown in Fig. 1, and enter the chamber 143 which is a portion of the inner course of the heat exchanger 130, and the air will then pass through the heat exchanger 130 and discharge into the cabin through the conduit 140. Any suitable ducting arrangement may of course be provided, if desired, for distributing the air from the conduit 140 within the cabin, and this statement also applies with respect to the conduit 206. A volume of air equal to that which is being continuously supplied through the conduit 140 is discharged through the cabin vent valve device 241. The temperature of the air entering the cabin will be somewhat reduced by its passage through the heat exchanger 130, it being noted that due to the range of compression in the second stage 117, there will be more heat in the air traversing the inner course of the heat exchanger than in that traversing the outer course.

As the aircraft is on the ground and not in motion at the instant under consideration, no air is tending to enter branch 104 from the rammed inlet. However, the valve 228 is maintained at this time in a position to open communication between the branch 104 and the valve casing 222; and the valves 209 and 223 are then in the position shown in Fig. 1, since the cabin temperature is assumed to be high. Thus the air which is being circulated by the blower to the inner course of the heat exchanger 147 will be subjected to a cooling effect as soon as the aircraft takes off and there is effected a rammed circulation of air through the outer course of this heat exchanger, and the air which so circulates through this heat exchanger will be delivered through the conduit 212 to the atmosphere. As soon as the aircraft takes off and there is a rammed flow of air through the outer course of the heat exchanger 147 the air which is then being circulated through the inner course of this heat exchanger by the blower 151 will be subjected to cooling before it is discharged through the opening 206 into the cabin, assuming that cabin temperature exceeds external temperature.

As the aircraft ascends to a height of say 8000 feet the automatic cabin vent valve will permit the cabin pressure to fall substantially as external pressure falls, and accordingly, still assuming the cabin temperature to remain above that which requires a supply of heat to the cabin, conditions will remain much the same save that the valve 126 may be moved by its automatic thermostatic control device to reduce the quantity of air passing through the outer course of the heat exchanger 130 and to provide for bypassing of this heat exchanger by a part of the air pumped by the first stage of the supercharger, and that the thermostatic control of the valve 228 may move the latter to reduce the amount of air passed through the outer course of heat exchanger 147. If desired, the variable back pressure valve device 152 may be released from its manually effected inoperative condition and allowed to function at a temperature insufficient to start the provision of heat by the combustion of fuel, this being possible by making the thermostatic device 566 responsive to a lower temperature than the thermostatic device 258. As later explained in connection with the second species of the invention from its system aspect which still remains to be described, the variable back pressure valve device 152 might be entirely omitted under some conditions.

From what has been said, it will be noted that if there is a tendency of cabin temperature to drop below a desired level there are a number of checks on the fall of cabin temperature: first, the air delivered to the cabin by the second stage of the pressurizing device is subjected to a diminished cooling effect; second, the air circulated by the blower is also cooled less by reason of a reduction in the supply of cooling air to the heat exchanger 147; third, if the heat responsive device 566 and associated parts be so designed, the application of a somewhat increased back pressure on the second stage discharge will aid in warming the cabin.

When the aircraft reaches the height of say 20,000 feet the free discharge of the oil pump 362 will be interrupted by the closure of the valve 470, and two things will occur. The valve 120 will be closed and thereafter all air taken into the low pressure stage 108 of the supercharger 109 will be compressed through the number of compressions for which this stage is designed, and moreover, the oil pressure will be delivered to act upon the piston 174 and move the valve 113 to interrupt communication of the intake of the high pressure stage 117 of the supercharger 109 with the conduit 193 and establish communication between this intake and the conduit 138. Thereafter the pressurizing device will operate "compound" until the aircraft moves below an altitude at which the valve 470 which controls the flow of oil from the oil pump 362 reopens the free escape passage for the latter.

The changes in rate of operation of the supercharger need not be detailed as they will not affect the general mode of operation of the system but will instead simply cause the supercharger to be operated in the desired manner.

When the piston 174 is moved to the position shown in Fig. 3 and shifts the valve 113 there will be, due to the linkage which connects the operating shaft 170 of the valve 113 with the operating arm 182 of the valve 145, and the arm 185 associated with the operating shaft 183 of the valve 145 with the arm 187 associated as heretofore described with the valve 126, a movement of the valve 145 to the position shown in Fig. 1, and the valve 126 will be removed from its thermostatic control and be fixed in the position of Figs. 1 and 2, in which position all the air pumped by the first stage 108 of the supercharger 109 must pass through the outer course of the heat exchanger 130. As a result, the latter will act as an intercooler for the supercharger 109, and the cooling medium will be the cabin air which will be circulated by the blower 151 through the inner course of the heat exchanger 130 and returned to the cabin by way of conduit 140.

There are thus accomplished two beneficial functions: first, the improvement of the performance of the pressurizing device, and second, the warming of the cabin by heat extracted from the air discharged by the first stage 108 of the supercharger 109.

With the valve 145 moved to the position shown in Figs. 1 and 2, it will be noted that the discharge from the high pressure stage 117 of the supercharger 109 will take place through the inner course of the heat exchanger 147 and thence into the cabin. Whether this air will be cooled or warmed will depend upon cabin temperature conditions. Air from the rammed inlet and the conduit 230 will be delivered past the valves 228 and 223 through the outer course of the heat exchanger and then to atmosphere through the valve 209, cooling the air delivered by this second stage of the supercharger when the cabin temperature is too high. When the cabin temperature is too low the variable back pressure device may operate within the limits imposed upon it by its restriction to a maximum differential between external pressure and back pressure and to a maximum compression ratio between external pressure and back pressure. Moreover, the combustion-type heater will come into operation when the temperature in the cabin falls to a predetermined minimum below which it is not desired to have cabin pressure go. The motor device 257 is adapted to be operated, under the control of the automatic temperature responsive switch device 258, in one direction or the other, depending on cabin temperature. As previously explained, when the temperature is high enough the valves 209 and 223 occupy the positions shown in Figs. 1 and 2. When, however, the cabin temperature falls below a predetermined limit the motor 257 reverses the position of the valves 209 and 223 and thereby connects the combustion space 233 of the heating device in circuit with the outer course of the heat exchanger 147, the thermostatically controlled valve 215 determining the volume of fluid which may pass through the outer course of this heat exchanger to the atmosphere from the conduit 216.

When the valves 209 and 223 are moved to the new positions described, the circuit to the igniter (spark plug) is closed, and as the valve 215 will be partially open under the control of its temperature responsive control device 220 cabin air will flow, as soon as the positions of the valves 209 and 223 permit this, through the motor section of the pump device 236, and cause the pumping of gasoline, at a rate proportional to the cabin temperature deficiency, to the nozzle 235 just beyond which it will be ignited. It will be obvious that the amount of air provided to maintain combustion will be in proper proportion to the quantity of gasoline pumped and burned, and accordingly proper combustion will be maintained, and the heat exchange in the exchanger 147, and the quantity of heat transmitted to the air entering the cabin will be such that the cabin temperature will be held close to the desired limit. Naturally the control of the valve 215 will be such that this valve will be closed and the fuel pump stopped when a cabin temperature exists at which the thermostatic switch device 258 will effect a shifting of the valves 209 and 223 back to the position shown in Figs. 1 and 2, and since the igniter will always be in operation when the valves last mentioned are in the positions opposite those shown in Figs. 1 and 2, an intermittent supply of fuel will not be dangerous if it occurs.

It will be understood that throughout the flight of the aircraft the automatically controlled cabin vent valve device 241 will maintain cabin pressure in the desired manner, to wit, in substantial correspondence with external pressure when the plane is operating below, say, 8000 feet; substantially uniform at the pressure corresponding with external pressure at, say, 8000 feet until the aircraft reaches an elevation of 30,000 feet; within a predetermined maximum pressure of the external pressure between heights of 30,000 and 40,000 feet; and bearing a predetermined ratio to external pressure at heights above 40,000 feet.

*The second illustrative embodiment*

Figure 45:
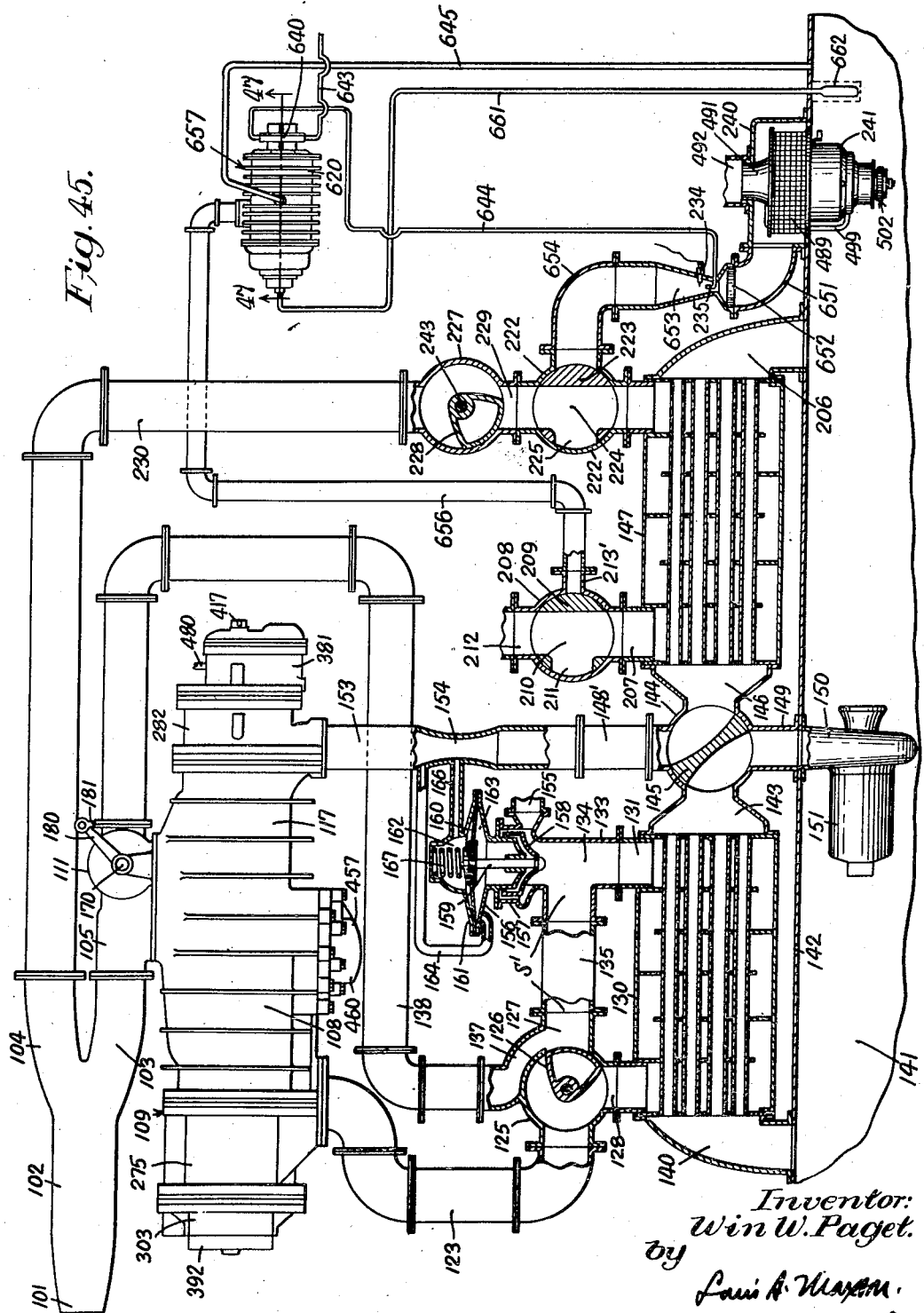
Fig. 45 is a view similar to Fig. 1, showing a modified system.
Figure 46:
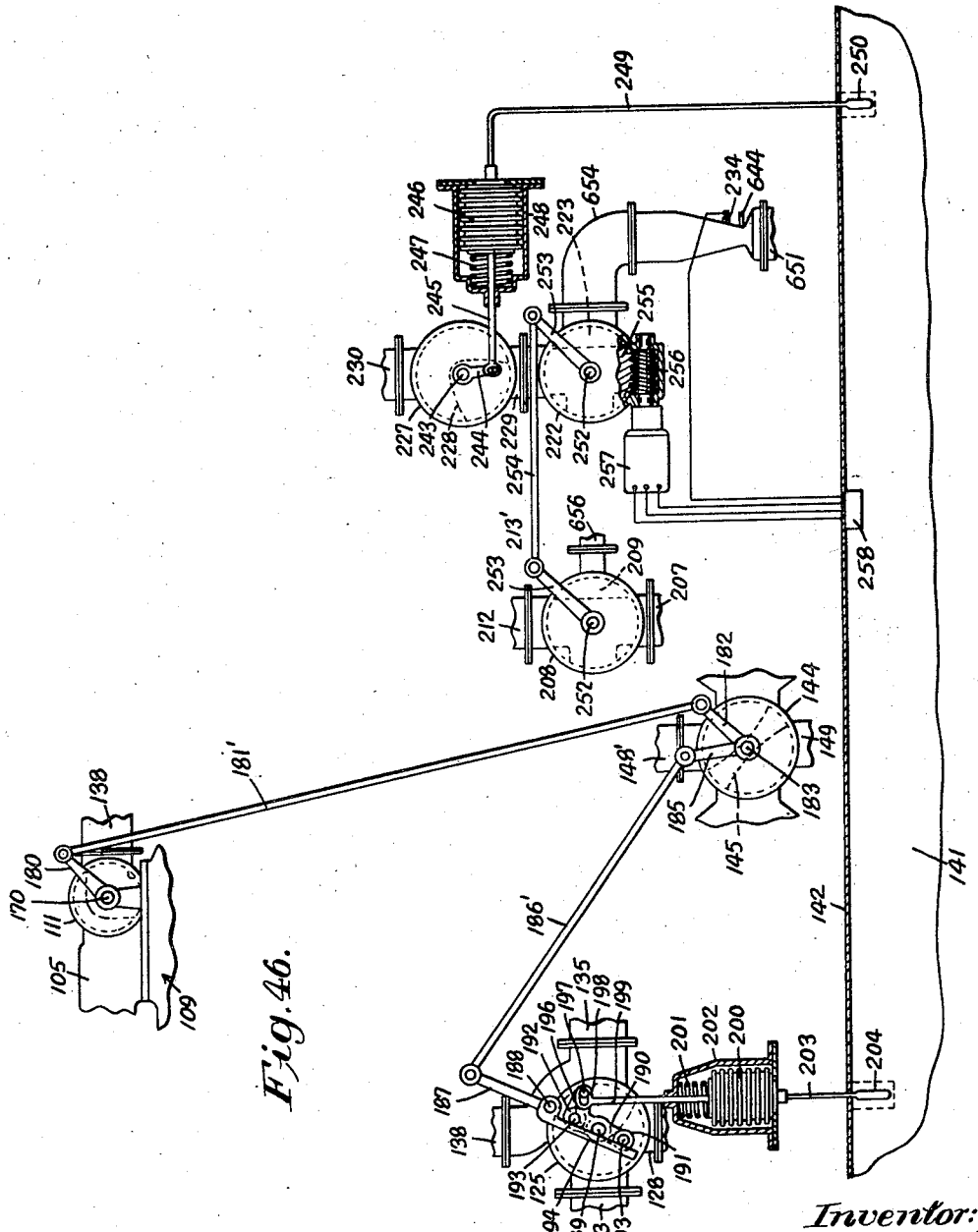
Fig. 46 is a view similar to Fig. 2, showing operating mechanisms associated with the system illustrated in Fig. 45.
Figure 47:
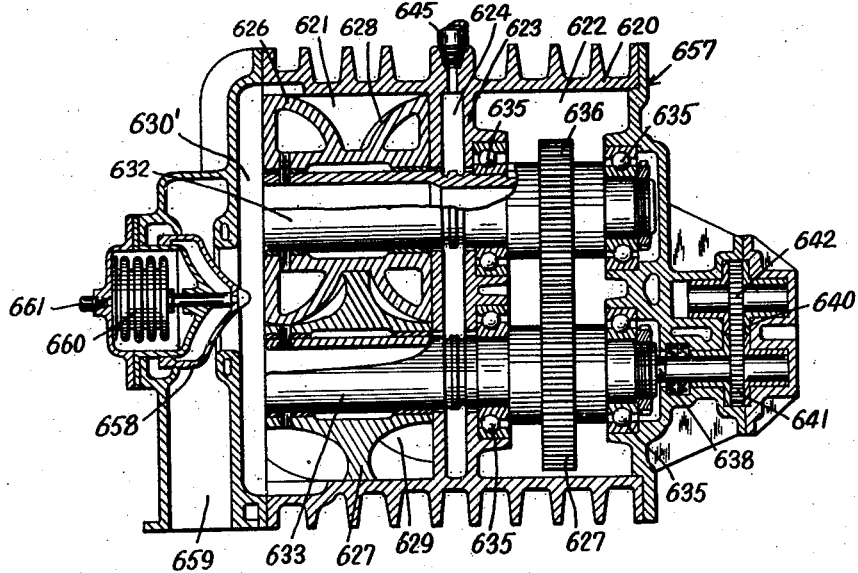
Fig. 47 is an enlarged horizontal sectional view on the plane of the line 47—47 of Fig. 45.

Referring now to the second species of the invention shown in Figs. 45, 46 and 47, it will be observed that the essential differences of this system from the one previously described reside in but two items. There is no variable back pressure imposing valve governed by cabin temperature variations arranged between the discharge of the second stage 117 of the supercharger 109 and the valve casing 144; and the combustion type heating device is differently arranged. Having in mind that all of the parts which are the same in the two systems bear corresponding reference characters to the extent to which these characters appear on the drawings of the second species, and that essentially similar parts which differ in minor details are simply primed, the layout of the second embodiment will be readily followed. It will be sufficient therefore simply to point out that the housing surrounding the screen of the cabin vent valve device 241 is connected by a conduit 651 through a screen 652 with a combustion chamber 653 of the gasoline fuel burning heater. This combustion chamber is connected by a conduit 654 with the valve casing 222. The valve casing 208 has its connection 212 with the atmosphere the same as in the first arrangement described, but its connection 213 communicates through a conduit 656 with a somewhat modified fuel pumping unit 657. This fuel pumping unit which is shown in Fig. 47 in section is very similar to the fuel pumping unit heretofore described, but it has its discharge space 630' connected, under the control of a thermostatically controlled valve 658, with a conduit 659 leading to the atmosphere. The valve 658 has its position regulated by a thermostatic controlled mechanism including a bellows 660, a conduit 661 and a fluid filled temperature responsive device 662 in the cabin. Now, it will be observed with respect to this arrangement that the combustion products produced by the burning of gasoline in the combustion chamber 653 pass through the heat exchanger 147 and through the conduit 656 and operate the rotors of the motor which drives the fuel pump, and the valve 658 controls the exhaust from these rotors to atmosphere, and by more or less opening or closing the communication with the exhaust the speed of operation of the pump operating motor will be regulated in accordance with the cabin temperature variations. The connection 645 and the chamber 624 within the partition 623 perform the important function of preventing any possible escape of the combustion products into the space 622 in which the drive for the fuel pump is arranged.

As the mode of operation of the second form of the invention from its system aspect will now be clear from what has been said, further description is unnecessary. It will be noted that in both cases the heating arrangement is entirely independent of altitude at any altitude above the minimum pressurizing altitude, in its operation, but that at relatively lower altitudes it supplies heat to the cabin by heating the air circulated by the blower while at higher altitudes it heats the air as it is delivered from the second stage of the supercharger. In the event that provision should be deemed necessary for heating the cabin at altitudes lower than the minimum pressurizing height, there can of course be provided the necessary pressure differential to cause the fuel pump to be operated by manually partially closing the cabin vent valve.

From the foregoing description it will be appreciated that the cabin conditions control system which I have disclosed includes among others the following features:

(a) the regulation of inlet pressure for the second stage by means of a bypass valve variably controlling the discharge of fluid from the first stage to atmosphere, and the regulation of this by-pass valve by the rate of flow from the second stage discharge;

(b) the utilization of the air which is being bypassed to atmosphere from the first stage discharge, to cool the second stage discharge to the cabin;

(c) the utilization of cabin air, flowing in a closed circuit, to intercool the air between the first and second stages, when the pressurizing device is being operated compound, thus both effecting an intercooling function and also helping to heat the cabin;

(d) the use of a heat exchanger between the second stage discharge and the cabin, the other course in this exchanger carrying either cooling air from outside the cabin, or hot air secured by burning liquid fuel in cabin discharge air;

(e) the use of cabin discharge air to support combustion (at cabin pressure) in the heater unit, the amount of fuel injected into the air being controlled by means of a positive displacement device which correlates the fuel and air deliveries. As above noted, the operating fluid moving to the flow-control and metering unit may be air from the cabin, or it may be cooled combustion products which have been passed through the second heat exchanger;

(f) the utilization of cooling air from the rammed inlet for the pressurizing device as the cooling medium for the heat exchangers, thus avoiding the necessity for a separate inlet and ducting system for the latter.

While there are in this application specifically described two forms which the invention may assume in practice, it will be understood that these forms of the same are shown for purposes of illustration and that the invention may be modified and further embodied in various other forms without departing from its spirit or the scope of the appended claims.

What I claim as new and desire to secure by Letters Patent is:

1. In combination, in an aircraft cabin conditions controlling system, a supercharger having intermediate and terminal discharges, a pair of heat exchangers, a connection from the intermediate discharge of said supercharger to one course of one of said heat exchangers, a rammed inlet connection for one course of the other heat exchanger, and valve means for selectively connecting said terminal discharge to the remaining course of either of said heat exchangers and through such course to an aircraft cabin.

2. In combination, in an aircraft cabin conditions controlling system, a supercharger having intermediate and terminal discharges, a pair of heat exchangers, a connection from the intermediate discharge of said supercharger to one course of one of said heat exchangers, a rammed inlet connection for one course of the other heat exchanger, and valve means having controlling means governed by conditions varying with the altitude of the aircraft for selectively connecting said terminal discharge to the remaining course of either of said heat exchangers and through such course to an aircraft cabin.

3. In combination, in an aircraft cabin conditions controlling system, a supercharger having intermediate and terminal discharges, a pair of heat exchangers, a connection from the intermediate discharge of said supercharger to one course of one of said heat exchangers, a rammed inlet connection for one course of the other heat exchanger, and valve means having controlling means governed by pressure conditions external to the cabin for selectively connecting said terminal discharge to the remaining course of either of said heat exchangers and through such course to an aircraft cabin.

4. In combination, in an aircraft cabin conditions controlling system, a supercharger having intermediate and terminal discharges, a pair of heat exchangers, a connection from the intermediate discharge of said supercharger to one course of one of said heat exchangers, a rammed inlet connection for one course of the other heat exchanger, valve means for selectively connecting said terminal discharge to the remaining course of either of said heat exchangers and through such course to an aircraft cabin, and a circulator for circulating cabin air through the remaining course of the other of said heat exchangers.

5. In combination, in an aircraft cabin conditions controlling system, a supercharger having intermediate and terminal discharges, a pair of heat exchangers, a connection from the intermediate discharge of said supercharger to one course of one of said heat exchangers, a rammed inlet connection for one course of the other heat exchanger, valve means having controlling means governed by the external pressure conditions for selectively connecting said terminal discharge to the remaining course of either of said heat exchangers and through such course to an aircraft cabin, and a circulator for circulating cabin air through the remaining course of the other of said heat exchangers.

6. In combination, a multistage compressor in each of the stages of which there is a compression ratio of greater than unity during compound operation, a heat exchanger having non-communicating courses, means for discharging fluid from the second stage of said compressor through one course of said heat exchanger to an aircraft cabin, and means for discharging variable quantities of fluid from the lower stage of said compressor through the other course of said heat exchanger.

7. In combination, a multistage compressor in each of the stages of which there is a compression ratio of greater than unity during compound operation and the first stage of which is provided with unloading means, a heat exchanger having non-communicating courses, means for discharging fluid from the second stage of said compressor through one course of said heat exchanger to an aircraft cabin, and means for discharging variable quantities of fluid, while said unloading means maintains said first stage unloaded, from the first stage of said compressor through the other course of said heat exchanger.

8. In combination, a multistage compressor in each of the stages of which there is a compression ratio of greater than unity during compound operation, a heat exchanger having non-communicating courses, means for discharging fluid from the second stage of said compressor through one course of said heat exchanger to an aircraft cabin, means for discharging variable quantities of fluid from the first stage of said compressor through the other course of said heat exchanger, and means for simultaneously effecting loading of the first stage of said compressor and switching the discharge of the second stage thereof from said heat exchanger.

9. In combination, a multistage compressor in each of the stages of which there is a compression ratio of greater than unity during compound operation, a heat exchanger having non-communicating courses, means for discharging fluid from the higher stage of said compressor through one course of said heat exchanger to a cabin, means for discharging fluid from the lower stage of said compressor through the other course of said heat exchanger and then to atmosphere, or directly to atmosphere, in inverse ratios depending on cabin temperature.

10. In combination, an aircraft cabin, a compound supercharger, a heat exchange device arranged between the stages of said supercharger and having the air undergoing compression pass therethrough on its way between said stages, said supercharger having its intake connected with the space exterior to said cabin and its terminal discharge in communication with said cabin, and means for circulating cabin air through said heat exchange device to effect a transfer of heat from the air passing between the stages of the supercharger to the circulated cabin air.

11. In combination, an aircraft cabin, a compound supercharger, a heat exchange device arranged between the stages of said supercharger and having the air undergoing compression pass therethrough on its way between said stages, said supercharger having its intake connected with the space exterior to said cabin and its terminal discharge in communication with said cabin, means for circulating cabin air through said heat exchange device to effect a transfer of heat from the air passing between the stages of the supercharger to the circulated cabin air, and means for venting variable quantities of air to atmosphere arranged between the heat exchange device and the intake to the higher stage of the supercharger.

12. In combination, an aircraft cabin, a compound supercharger, a heat exchange device arranged between the stages of said supercharger and having the air undergoing compression pass therethrough on its way between said stages, said supercharger having its intake connected with the space exterior to said cabin and its terminal discharge in communication with said cabin, means for circulating cabin air through said heat exchange device to effect a transfer of heat from the air passing between the stages of the supercharger to the circulated cabin air, and means governed by the mass flow of air between the terminal discharge of said supercharger and the cabin for venting variable quantities of air to atmosphere arranged between the heat exchange device and the intake to the higher stage of the supercharger.

13. In combination, an aircraft cabin, a supercharger, a heat exchange device having one course thereof arranged in series between the discharge of said supercharger and the cabin, and means for selectively circulating through the other course of said heat exchanger gaseous fluids respectively cooler than the discharge air from said supercharger and warmer than the discharge air from said supercharger, said last mentioned means including a source of such a cooler fluid and a source of such a warmer fluid and valves arranged at the opposite ends of said heat exchanger device and governed by cabin temperature changes, the valve at one end of said heat exchanger device being positionable selectively to connect said sources separately with said other course of said heat exchange device.

14. In combination, an aircraft cabin, a supercharger, a heat exchange device having one course thereof arranged in series between the discharge of said supercharger and the cabin, and means for selectively circulating through the other course of said heat exchanger gaseous fluids respectively cooler than the discharge air from said supercharger and warmer than the discharge air from said supercharger, said last mentioned means including three-way valves arranged at the opposite ends of said heat exchange device and governed by cabin temperature changes, one of said valves movable to connect different sources of gaseous fluid with said latter course and the other to open different paths from said latter course to the exterior of the cabin.

15. In combination, an aircraft cabin, a supercharger, a heat exchange device having one course thereof arranged in series between the discharge of said supercharger and the cabin, and means for selectively circulating through the other course of said heat exchanger gaseous fluids respectively cooler than the discharge air from said supercharger and warmer than the discharge air from said supercharger, said last mentioned means including three-way valves arranged at the opposite ends of said heat exchange device and governed by cabin temperature changes, one of said valves movable to connect different sources of gaseous fluid with said latter course and the other to open different paths from said latter course to the exterior of the cabin, and there being further, between the source of cooler gaseous fluid and said first mentioned three-way valve, an additional cabin temperature controlled valve.

16. In combination, an aircraft cabin, a supercharger, a heat exchange device having one course thereof arranged in series between the discharge of said supercharger and the cabin, and means for selectively circulating through the other course of said heat exchanger gaseous fluids respectively cooler than the discharge air from said supercharger and warmer than the discharge air from said supercharger, said last mentioned means including three-way valves arranged at the opposite ends of said heat exchange device and governed by cabin temperature changes, one of said valves movable to connect different sources of gaseous fluid with said latter course and the other to open different paths from said latter course to the exterior of the cabin, and there being further in one of said paths an additional valve under cabin temperature control for controlling the escape of fluid to the atmosphere.

17. In combination, an aircraft cabin, a supercharger, a heat exchange device having one course thereof arranged in series between the discharge of said supercharger and the cabin, and means for selectively circulating through the other course of said heat exchanger gaseous fluids respectively cooler than the discharge air from said supercharger and warmer than the discharge air from said supercharger, said last mentioned means including three-way valves arranged at the opposite ends of said heat exchange device and governed by cabin temperature changes, one of said valves movable to connect different sources of gaseous fluid with said latter course and the other to open different paths from said latter course to the exterior of the cabin, there being further, between the source of cooler gaseous fluid and said first mentioned three-way valve, an additional cabin temperature controlled valve, and there being still further in one of said paths an additional valve under cabin temperature control for controlling the escape of fluid to the atmosphere.

18. In a cabin heating system, an aircraft cabin, a heat exchanger having two courses, means for delivering air through one of said courses into said cabin, means for venting said cabin in a manner to maintain a cabin pressure exceeding the exterior pressure during flight through a predetermined range, and means for effecting a flow of combustion products through the other of said courses under the differential in pressure which exists between the interior of the cabin and the exterior thereof.

19. In a cabin heating system, an aircraft cabin, a heat exchanger having two courses, means for delivering air through one of said courses into said cabin, means for venting said cabin in a manner to maintain a cabin pressure exceeding the exterior pressure during flight through a predetermined range, and means for effecting a flow of combustion products through the other of said courses under the differential in pressure which exists between the interior of the cabin and the exterior thereof including means for burning a fuel in an air stream flowing from the cabin through said latter course and to the atmosphere.

20. In a cabin heating system, an aircraft cabin, a heat exchanger having two courses, means for delivering air through one of said courses into said cabin, means for venting said cabin in a manner to maintain a cabin pressure exceeding the exterior pressure during flight through a predetermined range, passage means connecting the other of said courses in communication with the interior and exterior of said cabin and operating under the differential in pressure between the interior and exterior of said cabin to conduct an air stream through said latter course, means operated by the differential between cabin and external pressures for supplying fuel to said air stream, and means for effecting the burning of the fuel in said air stream.

21. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude or air from outside the cabin when the aircraft is above such altitude, and means for selectively causing the passage through the other course of said heat exchanger of substantially unheated air from outside the cabin or air at a temperature in excess of the cabin temperature.

22. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude and air from outside the cabin when the aircraft is above such altitude, and means governed by cabin temperature for selectively causing the passage through the other course of said heat exchanger of substantially unheated air from outside the cabin or air at a temperature in excess of the cabin temperature.

23. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude and air from outside the cabin when the aircraft is above such altitude, and means including valve devices arranged respectively at the inlet end and at the outlet end of the other course of said heat exchanger for selectively causing the passage through said other course of said heat exchanger of substantially unheated air from outside the cabin or air at a temperature in excess of the cabin temperature.

24. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude and air from outside the cabin when the aircraft is above such altitude, and means including valve devices arranged respectively at the inlet end and at the outlet end of the other course of said heat exchanger and cabin temperature controlled motor operated valves for shifting said valve devices concurrently, for selectively causing the passage through said other course of said heat exchanger of substantially unheated air from outside the cabin or air at a temperature in excess of the cabin temperature.

25. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude and air from outside the cabin when the aircraft is above such altitude, and means for selectively causing the passage through the other course of said heat exchanger of substantially unheated air from outside the cabin or air from inside the cabin at a temperature in excess of the cabin temperature.

26. In an aircraft cabin temperature controlling system, an aircraft cabin, a heat exchanger having a course connected at one end to the cabin and having means for delivering to the other end of said course air which is to have the temperature thereof changed, aircraft elevation controlled means for selectively delivering to said course at said other end thereof air drawn from the cabin when the aircraft is at or below a predetermined altitude and air from outside the cabin when the aircraft is above such altitude, and means for selectively causing the passage through the other course of said heat exchanger of substantially unheated air from outside the cabin or warmer air from inside the cabin.

27. A system as defined in claim 21 in which means is provided for effecting a flow of the air which is at a temperature in excess of the cabin temperature by the differential between cabin and external pressures.

28. A system as defined in claim 21 in which means is provided for effecting a flow of the air which is at a temperature in excess of the cabin temperature by the differential between cabin and external pressures and in which the rate of flow is thermostatically controlled.

29. A system as defined in claim 21 in which means is provided for effecting a flow of the air which is at a temperature in excess of the cabin temperature by the differential between cabin pressure and external pressure and in which such flowing air is discharged to the exterior of the cabin under the control of a thermostatically governed valve whose position is determined by cabin temperature.

30. A system as defined in claim 21 in which the temperature of the air at a temperature in excess of the cabin temperature is elevated by means of a device for burning a fuel in a stream of air flowing from the interior of the cabin through said other course of said heat exchanger to the exterior of the cabin.

31. A system as defined in claim 21 in which the temperature of the air at a temperature in excess of the cabin temperature is elevated by means of a device for burning a fuel in a stream of air flowing from the interior of the cabin through said other course of said heat exchanger to the exterior of the cabin, and a fuel pump having an air operated driving motor arranged in the flowing stream of air from the cabin is provided to supply a metered quantity of fuel.

32. In a heating apparatus, a heat exchanger, means for delivering fluid to be raised in temperature through said heat exchanger into the cabin of an aircraft, means for effecting an increase in cabin pressure over exterior pressure by the fluid supplied to said cabin, said heat exchanger having a course through which a heating fluid is adapted to be discharged, a conduit connecting the interior of the cabin with one end of said course and having a fuel nozzle therein, a conduit connecting the other end of said course to a fuel pumping unit, said fuel pumping unit including a fuel pump having its discharge connected to said nozzle and having a driving motor exhausting to atmosphere and to whose inlet said second conduit is connected.

33. In a heating apparatus, a heat exchanger, means for delivering fluid to be raised in temperature through said heat exchanger into the cabin of an aircraft, means for effecting an increase in cabin pressure over exterior pressure by the fluid supplied to said cabin, said heat exchanger having a course through which a heating fluid is adapted to be discharged, a conduit connecting the interior of the cabin with one end of said course and having a burner nozzle therein, a conduit connecting the other end of said course to a fuel pumping unit, said fuel pumping unit including a fuel pump having its discharge connected to said nozzle and having a driving motor exhausting to atmosphere and to whose inlet said second conduit is connected, and means for regulating the speed of said motor and thereby of said pump and so regulating the rate of combustion including a valve for throttling the exhaust from said motor, said valve having thermostatic controlling means responsive to cabin temperature.

34. In a heating apparatus, a heat exchanger, means for delivering fluid to be raised in temperature through said heat exchanger into the cabin of an aircraft, means for effecting an increase in cabin pressure over exterior pressure by the fluid supplied to said cabin, said heat exchanger having a course through which a heating fluid is adapted to be discharged, a conduit connecting the interior of the cabin with one end of said course and having a burner nozzle therein, a conduit connecting the other end of said course to the atmosphere, a fuel pumping unit including a fuel pump having its discharge connected to said nozzle and having a driving motor arranged in one of said conduits whereby the fluid flowing in said conduit operates said motor, and means for regulating the speed of said motor including a valve for controlling the rate of fluid flow therethrough, said valve having thermostatic controlling means responsive to cabin temperatures.

35. In combination, an aircraft cabin, a supercharger having a primary stage and a secondary stage each having an intake and a discharge, a heat exchanger having two courses, an intake passage for conducting external air to the intake of the primary stage of said supercharger, means forming a space selectively connectible with the discharge of the primary stage of the supercharger either directly or through one of the courses of said heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of said heat exchanger with the discharge of the primary stage of the supercharger, and valve means movable to connect the discharge of the secondary stage of the supercharger alternatively through the other course of the heat exchanger or independently of said heat exchanger, with said aircraft cabin.

36. In combination, an aircraft cabin, a supercharger having a primary stage and a secondary stage each having an intake and a discharge, a heat exchanger having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of said heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of said heat exchanger with the discharge line from the primary stage of the supercharger, valve means movable to connect the discharge line from the secondary stage of the supercharger alternatively through the other course of the heat exchanger or independently of said heat exchanger with said aircraft cabin, and operating means for said several valve means including a cabin temperature controlled operating means for said second mentioned valve means.

37. In combination, an aircraft cabin, a supercharger having a primary stage and a secondary stage each having an intake and a discharge, a heat exchanger having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of said heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of said heat exchanger with the discharge line from the primary stage of the supercharger, valve means movable to connect the discharge line from the secondary stage of the supercharger alternatively through the other course of the heat exchanger or independently of said heat exchanger with said aircraft cabin, and operating means for each of said valve means for automatically insuring the positioning thereof to effect their respective second mentioned connections upon the attainment of said cabin to a predetermined height.

38. In combination, an aircraft cabin, a supercharger having a primary stage and a secondary stage each having an intake and a discharge, a heat exchanger having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of said heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of said heat exchanger with the discharge line from the primary stage of the supercharger, valve means movable to connect the discharge line from the secondary stage of the supercharger alternatively through the other course of the heat exchanger or independently of said heat exchanger with said aircraft cabin, and operating means for said valve means including a cabin temperature controlled operating means for said second mentioned valve means effective during flight at altitudes below a predetermined height, and an altitude controlled, operating device for effecting power positioning of each of said valve means in predetermined positions upon the attainment of said cabin to a predetermined altitude.

39. In combination, an aircraft cabin, a supercharger having a primary stage and a secondary stage each having an intake and a discharge, a heat exchanger having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of said heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of said heat exchanger with the discharge line from the primary stage of the supercharger, valve means movable to connect the discharge line from the secondary stage of the supercharger alternatively through the other course of the heat exchanger or independently of said heat exchanger with said aircraft cabin, and operating means for said several valve means including means for automatically positioning the first and third mentioned ones thereof to effect their respective first mentioned connection and for subjecting said second mentioned valve means to cabin temperature control while said cabin is at altitudes below a predetermined height, and for insuring the positioning of each of said valve means to effect its second mentioned connection when the cabin is above a predetermined height.

40. In combination, an aircraft cabin, a supercharger having a primary stage and a secondary stage each having an intake and a discharge, a first heat exchanger and a second heat exchanger each having two courses, an intake passage for conducting external air to the intake of the primary stage of said supercharger, means forming a space selectively connectible with the discharge of the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge of the primary stage of the supercharger, and valve means movable to connect the discharge of the secondary stage of the supercharger alternatively through the other course of the first heat exchanger or through one of the courses of the second heat exchanger, with said aircraft cabin.

41. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, and controlling means for said valve means normally maintaining the first and third mentioned ones thereof in positions to effect their respective first mentioned connection and said second mentioned valve means under cabin temperature control while said cabin is at altitudes below a predetermined height and operative automatically to effect the holding of each of said valve means in its position for effecting its respective second mentioned connection when said aircraft is at altitudes above said predetermined level.

42. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, and controlling means for said several valve means including a cabin temperature governed operating mechanism for said second mentioned valve means effective at ground level and at predetermined altitudes, and hydraulically actuated operating means automatically operative at heights above said predetermined altitudes for holding each of said valve means in its position for effecting its respective second mentioned connection.

43. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, altitude controlled hydraulic operating means for effecting the positioning of each of said valve means in its respective position for establishing its second mentioned connections, and cabin temperature controlled means for effecting the flow of a heating or of a cooling medium through the other course of the second heat exchanger.

44. In combination, an aircraft cabin, a supercharger having a primary stage and a secondary stage each having an intake and a discharge, a first heat exchanger and a second heat exchanger each having two courses, an intake passage for conducting external air to the intake of the primary stage of said supercharger, means forming a space selectively connectible with the discharge of the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge of the primary stage of the supercharger, valve means movable to connect the discharge of the secondary stage of the supercharger alternatively through the other course of the first heat exchanger or through one of the courses of the second heat exchanger, with said aircraft cabin, and valve means associated with said second heat exchanger for controlling the flow relative to the latter of fluids at different temperatures from the fluid traversing the first mentioned course thereof.

45. In combination, an aircraft cabin, a supercharger having a primary stage and a secondary stage each having an intake and a discharge, a first heat exchanger and a second heat exchanger each having two courses, an intake passage for conducting external air to the intake of the primary stage of said supercharger, means forming a space selectively connectible with the discharge of the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge of the primary stage of the supercharger, valve means movable to connect the discharge of the secondary stage of the supercharger alternatively through the other course of the first heat exchanger or through one of the courses of the second heat exchanger, with said aircraft cabin, and means for circulating air from the cabin and back to the same through either one of the courses to which the secondary stage of the supercharger is adapted to have its discharge connected when such discharge is connected to the other one of said courses.

46. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, means for circulating air from the cabin and back to the same through either one of the courses to which the secondary stage of the supercharger is adapted to have its discharge connected when such discharge is connected to the other one of said courses, valve means for controlling the flow of a heat transfer fluid to the second course of said second heat exchanger, and cabin temperature controlled controlling devices for said second and last mentioned valve means.

47. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, means for circulating air from the cabin and back to the same through either one of the courses to which the secondary stage of the supercharger is adapted to have its discharge connected when such discharge is connected to the other one of said courses, valve means for controlling the flow of a heat transfer fluid through the second course of said second heat exchanger, temperature controlled operating means for said second and fourth mentioned valve means, and altitude governed controlling means for said first and third mentioned valve means further having an overriding control of said second mentioned valve means.

48. In combination, an aircraft cabin, a supercharger having a primary stage and a secondary stage each having an intake and a discharge, a first heat exchanger and a second heat exchanger each having two courses, an intake passage for conducting external air to the intake of the primary stage of said supercharger, means forming a space selectively connectible with the discharge the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge of the primary stage of the supercharger, valve means movable to connect the discharge the secondary stage of the supercharger alternatively through the other course of the first heat exchanger or through one of the courses of the second heat exchanger, with said aircraft cabin, means for circulating air from the cabin and back to the same through either one of the courses to which the secondary stage of the supercharger is adapted to have its discharge connected when such discharge is connected to the other one of said courses, and valve means for selectively effecting transmission of air from outside the cabin or transmission of heated cabin air through the second course of said second heat exchanger.

49. In combination, an aircraft cabin, a supercharger having a primary stage and a secondary stage each having an intake and a discharge, a first heat exchanger and a second heat exchanger each having two courses, a discharge line from the primary stage of said supercharger, a discharge line from the secondary stage of said supercharger, an intake passage for external air for the primary stage of said supercharger, means forming a space selectively connectible with the discharge line from the primary stage of the supercharger either directly or through one of the courses of the first heat exchanger, a conduit for connecting said space with the intake of the secondary stage of said supercharger, valve means movable to connect said intake passage to the intake of said secondary stage or to connect the intake of said secondary stage with said conduit, valve means movable to connect said space directly or through the first mentioned course of the first heat exchanger with the discharge line from the primary stage of the supercharger, valve means movable to connect the discharge line from the secondary stage of the supercharger alternatively through the other course of the first heat exchanger or through one of the courses of the second heat exchanger with said aircraft cabin, means for circulating air from the cabin and back to the same through either one of the courses to which the secondary stage of the supercharger is adapted to have its discharge connected when such discharge is connected to the other one of said courses, means under cabin temperature control for effecting the flow of a heat transfer fluid through the other course of said second heat exchanger, and means in the discharge line from the secondary stage of said supercharger and controlled by cabin temperature for subjecting said discharge to a variable back pressure.

50. In combination, in an aircraft having a cabin, a plural stage supercharger, a single rammed inlet connection, an aftercooler for said supercharger having one of its courses disposed between the terminal discharge of the latter and said cabin, branched conduits leading from said rammed inlet connection respectively to the intake of said supercharger and to another course of said aftercooler, and means for automatically selectively effecting a flow of heated cabin air through said last mentioned course of said aftercooler or of air from said rammed inlet therethrough, under cabin temperature control.

51. In combination, in an aircraft having a cabin, a heat exchanger, means for effecting a flow of air through one course of said heat exchanger and into said cabin, a conduit leading from the cabin through another course of said heat exchanger to a motor, means operated by said motor for pumping fuel to said conduit at a point between the cabin and said second course, means for igniting such fuel, and means for controlling the exhaust from said motor automatically in accordance with cabin temperature, said motor operated by the cabin air containing combustion products after its passage through said heat exchanger and having a sealing chamber connected with the interior of the cabin for preventing the passage of such air except to exhaust.

52. In combination, in an aircraft cabin temperature controlling system, a multistage supercharger, a heat exchanger having one course connected between a low pressure stage and a high pressure stage of said supercharger, means for variably venting air from said course to the atmosphere, and means for effecting the flow of air from said high pressure stage of the supercharger through another course of said heat exchanger to a cabin.

53. In combination, a supercharger having intermediate and terminal discharge connections through which, respectively, air at an intermediate pressure and air at terminal pressure is dischargeable, the latter connection having a discharge line adapted to deliver air to an aircraft cabin or the like, and the former connection having a communication with the atmosphere, and valve means governed by the mass flow in the discharge line for regulating the area of said communication with the atmosphere in a manner to maintain a relatively uniform mass flow in the discharge line.

54. In combination, a supercharger having intermediate and terminal discharge connections, the latter connection having a discharge line adapted to deliver air to an aircraft cabin or the like and said discharge line having between the ends thereof a venturi and the former connection having a communication with the atmosphere, valve means for regulating the flow area of said communication with the atmosphere, and controlling means for said valve means including a pressure responsive element subjected on the opposite sides thereof to the pressure conditions in the inlet to said venturi and at the throat of the latter, said controlling means being so arranged as to effect an opening movement of said valve means as the flow of air in said discharge line increases above a predetermined amount.

55. In combination, a supercharger having first and second stages, the discharge from the second stage being adapted to deliver air to an aircraft cabin or the like and the discharge from said first stage having a communication with the atmosphere, and valve means governed by the mass flow in said discharge line for regulating the area of said communication with the atmosphere in a manner to maintain a relatively uniform mass flow in the discharge line.

56. In combination, a multi-stage supercharger having the discharge of the second stage thereof adapted to deliver air to an aircraft cabin or the like and the discharge from the first stage thereof connected with the intake of the second stage of the supercharger and having valve controlled means for variably venting the discharge from said first stage to atmosphere, said valve controlled means having a control device governed by the mass flow in the discharge line from the second stage of said supercharger and operating on increase in mass flow for effecting an increased venting by said valve controlled means.

57. In combination, a supercharger having a primary stage and a secondary stage and having means for connecting the discharge from said primary stage to the intake of the secondary stage, a discharge line from said secondary stage, and means for varying the quantity of fluid delivered from said primary stage to said secondary stage including valve means associated with said connecting means, said valve means operating to vary the quantity of fluid delivered in inverse proportion to the mass flow in said discharge line.

58. In combination, a supercharger having a primary stage and a secondary stage and having means for connecting the discharge from said primary stage to the intake of the secondary stage, a discharge line from said secondary stage, and means for varying the quantity of fluid delivered from said primary stage to said secondary stage including vent valve means associated with said connecting means, and means governed by the mass flow in said discharge line for opening said vent valve means as the fluid flow in the discharge line increases above a predetermined amount.

59. In combination, a supercharger having a primary stage and a secondary stage and having means for connecting the discharge from said primary stage to the intake of the secondary stage, a discharge line from said secondary stage, and means for varying the quantity of fluid delivered from said primary stage to said secondary stage including valve means associated with said connecting means and having controlling means governed by the mass flow from said secondary stage, said controlling means controlling said valve means to vary the quantity of fluid delivered in inverse proportion to the mass flow from said secondary stage.

60. In combination, a supercharger having a primary stage and a secondary stage and having means for connecting the discharge from said primary stage to the intake of the secondary stage, a discharge line from said secondary stage, and means for varying the quantity of fluid delivered from said primary stage to said secondary stage including a bypass-controlling valve means associated with said connecting means and having controlling means governed by the mass flow from said secondary stage, said controlling means controlling said valve means to bypass fluid in direct proportion to the mass flow from said secondary stage.

61. In an aircraft cabin pressurizing system, a multi-stage pumping apparatus having an intercooler and discharging to a cabin, and means governed by the mass flow from the terminal discharge of said supercharger whereby any desired amount of air delivered by the primary stage of the supercharger may be bypassed to the outside of the cabin instead of being delivered to the intake of the second stage, said means operating to bypass air in direct proportion to the mass flow from the terminal discharge.

62. In an aircraft cabin pressurizing system, a cabin, a multi-stage pumping apparatus having an intercooler and having its terminal discharge leading to said cabin, and means for causing said pumping apparatus to deliver a uniform mass flow of air to the cabin notwithstanding the delivery by the primary stage thereof of quantities of air in excess of the amount requisite for delivery to the next stage in order to enable the latter to maintain such a uniform mass flow to the cabin, said last mentioned means including means whereby variable amounts of air delivered by the primary stage of said pumping apparatus may be bypassed to the outside of the cabin instead of being delivered to the intake of the second stage, said bypassing means having control means governed by the discharge from the second stage of said pumping apparatus for maintaining the quantity of air delivered to the second stage of said pumping apparatus at the requisite amount to enable the same to deliver a uniform mass flow of air to the cabin.

63. A multistage compressor having valve means for blowing off fluid between stages thereof, and valve actuating means including a valve actuating device automatically responsive to the mass flow of fluid from the terminal discharge for opening said valve means as the mass flow of fluid from the terminal discharge exceeds a predetermined amount.

64. A multistage compressor having a blow-off opening between stages thereof, a valve for controlling said opening, means for yieldably urging said valve toward its closed position, and means for opening said valve as the mass flow of fluid from the terminal discharge of the compressor exceeds a predetermined amount, said last mentioned means including a device responsive to the mass flow of fluid from the terminal discharge.

65. In an aircraft cabin pressurizing system, a cabin, a multistage compressor having its terminal discharge leading to said cabin, and means for causing said compressor to deliver a uniform mass flow of air to the cabin notwithstanding the delivery by a stage antecedent to the final stage of said compressor of quantities of air in excess of the amount requisite for delivery to the next stage in order to enable the final stage to maintain such a uniform mass flow to the cabin, said last mentioned means including means whereby variable portions of the air discharged by a stage of said compressor antecedent to its final stage may be bypassed to the outside of the cabin instead of being delivered to the intake of the next stage of said compressor, said last mentioned means including control means governed by the discharge from said compressor for maintaining the quantity of air delivered to said next stage at the requisite amount to enable the delivery of a uniform mass flow of air to the cabin.

WIN W. PAGET.

REFERENCES CITED

The following references are of record in the file of this patent:

UNITED STATES PATENTS

| Number | Name | Date |
|---|---|---|
| 988,463 | Hackney | Apr. 4, 1911 |
| 1,097,259 | Nusim | May 19, 1914 |
| 1,110,864 | Banner | Sept. 15, 1914 |
| 1,111,498 | Rotter | Sept. 22, 1914 |
| 1,476,971 | Hurd | Dec. 11, 1923 |
| 1,796,053 | Schmidt | Mar. 10, 1931 |
| 1,965,733 | Chamberlain | July 10, 1934 |
| 2,022,057 | Gregg | May 21, 1935 |
| 2,065,955 | Waseige | Dec. 29, 1936 |
| 2,119,402 | Puffer | May 31, 1938 |
| 2,223,178 | Fevre | Nov. 26, 1940 |
| 2,309,064 | Gregg et al. | Jan. 19, 1943 |
| 2,309,683 | Wahlmark | Feb. 2, 1943 |
| 2,316,237 | Grunert et al. | Apr. 13, 1943 |
| 2,316,416 | Gregg | Apr. 13, 1943 |
| 2,327,737 | Pendergast | Aug. 24, 1943 |
| 2,353,201 | Talbot | July 11, 1944 |
| 2,364,458 | McCollum | Dec. 5, 1944 |
| 2,370,035 | Heymann | Feb. 20, 1945 |
| 2,385,664 | Warner | Sept. 25, 1945 |
| 2,412,110 | Williams | Dec. 3, 1946 |

FOREIGN PATENTS

| Number | Country | Date |
|---|---|---|
| 573,610 | Germany | Apr. 3, 1933 |

Certificate of Correction

Patent No. 2,444,951.

July 13, 1948.

WIN W. PAGET

It is hereby certified that errors appear in the printed specification of the above numbered patent requiring correction as follows: Column 8, line 60, for the word "up" read *upon*; line 63 after "through" insert *the*; column 9, line 62, for "pressure" read *pressures*; column 10, line 61, for "to either" read *be either*; column 14, lines 45 and 46, for "conrtolling" read *controlling*; column 21, line 54, for "rotatively" read *rotatably*; column 26, line 16, after "leads" insert *to*; column 45, lines 25 and 37, after "discharge" insert *of*; column 50, line 2, list of references cited, for "2,022,057" read *2,002,057*; and that the said Letters Patent should be read with these corrections therein that the same may conform to the record of the case in the Patent Office.

Signed and sealed this 30th day of November, A. D. 1948.

[SEAL]

THOMAS F. MURPHY,
*Assistant Commissioner of Patents.*